(12) United States Patent
Fox et al.

(10) Patent No.: US 12,152,224 B2
(45) Date of Patent: *Nov. 26, 2024

(54) REFINED FERMENTED BEVERAGES, AND A METHOD THEREOF

(71) Applicant: MARK ANTHONY INTERNATIONAL SRL, St. Michael (BB)

(72) Inventors: David G. Fox, Chicago, IL (US); Anthony C. Vieira, East Dennis, MA (US); Jacob M. Mattson, Bellevue, NE (US)

(73) Assignee: MARK ANTHONY INTERNATIONAL SRL, St. Michael (BB)

( * ) Notice: Subject to any disclaimer, the term of this patent is extended or adjusted under 35 U.S.C. 154(b) by 779 days.

This patent is subject to a terminal disclaimer.

(21) Appl. No.: 16/927,744

(22) Filed: Jul. 13, 2020

(65) Prior Publication Data

US 2021/0032579 A1 Feb. 4, 2021

Related U.S. Application Data

(63) Continuation-in-part of application No. 16/101,797, filed on Aug. 13, 2018, now Pat. No. 10,745,658, and
(Continued)

(51) Int. Cl.
*C12C 5/02* (2006.01)
*C12H 1/07* (2006.01)
(Continued)

(52) U.S. Cl.
CPC ............... *C12C 5/02* (2013.01); *C12H 1/063* (2013.01); *C12C 11/003* (2013.01); *C12C 12/006* (2013.01)

(58) Field of Classification Search
CPC .. C02F 1/66; C12H 1/10; C12H 1/003; C12H 1/00; C12C 12/00
See application file for complete search history.

(56) References Cited

U.S. PATENT DOCUMENTS 2,206,066 A 7/1940 Wallerstein
2,416,007 A 2/1947 Joachim
(Continued)

FOREIGN PATENT DOCUMENTS

CN 1616635 A 5/2005
CN 101276225 A 10/2008
(Continued)

OTHER PUBLICATIONS

Zhang et al Predicting acetic acid content in the final beer using neural networks and support vector machine Published Jan. 27, 2013 https://onlinelibrary.wiley.com/doi/epdf/10.1002/jib.50 (Year: 2013).*

(Continued)

*Primary Examiner* — Vera Stulii
(74) *Attorney, Agent, or Firm* — Daniel F. Nesbitt; Daniel H. Lajiness; Nesbitt IP LLC

(57) ABSTRACT

Methods and systems for making refined fermented beverages, including neutral malt beverages, having reduced or negligible levels of organic acids, particularly acetic acid, relative to bright beer and other untreated fermented beverages. The refined fermented beverages are produced using a caustic dosing system to neutralize naturally-present organic acids typically present in untreated fermented beverages and convert them into their respective conjugate bases as salts.

(Continued)

The salts of the neutralized organic acids are then removed or separated from the treated fermented beverage to form the refined fermented beverage.

20 Claims, 5 Drawing Sheets

Related U.S. Application Data a continuation of application No. PCT/US2019/046308, filed on Aug. 13, 2019, which is a continuation-in-part of application No. 16/101,797, filed on Aug. 13, 2018, now Pat. No. 10,745,658.

(60) Provisional application No. 62/544,261, filed on Aug. 11, 2017, provisional application No. 62/880,827, filed on Jul. 31, 2019.

(51) Int. Cl.
     *C12C 11/00* (2006.01)
     *C12C 12/00* (2006.01)

(56) References Cited

U.S. PATENT DOCUMENTS

| | | | |
|---|---|---|---|
| 2,892,718 | A | 6/1959 | Stone |
| 3,594,178 | A | 7/1971 | Meisler |
| 3,908,021 | A | 9/1975 | Rehberger et al. |
| 4,217,217 | A | 8/1980 | Kay et al. |
| 4,440,795 | A | 4/1984 | Goldstein et al. |
| 5,108,929 | A | 4/1992 | Segura et al. |
| 5,294,450 | A | 3/1994 | Word et al. |
| 5,480,665 | A | 1/1996 | Smith |
| 5,618,572 | A | 4/1997 | Tripp et al. |
| 6,495,180 | B1 | 12/2002 | Gurol |
| 6,748,849 | B2 | 6/2004 | Wilson et al. |
| 7,008,652 | B2 | 3/2006 | Effler |
| 8,128,787 | B2 | 3/2012 | Wynn et al. |
| 8,697,169 | B2 | 4/2014 | Duan et al. |
| 10,745,658 | B2 | 8/2020 | Fox et al. |
| 2003/0196955 | A1 | 10/2003 | Hughes |
| 2003/0232108 | A1 | 12/2003 | Effler |
| 2004/0067280 | A1 | 4/2004 | Bonnet et al. |
| 2005/0064066 | A1 | 3/2005 | Ramsden |
| 2006/0088632 | A1 | 4/2006 | Armes et al. |
| 2007/0138093 | A1 | 6/2007 | Bossler et al. |
| 2007/0221552 | A1 | 9/2007 | Denney |
| 2008/0175963 | A1 | 7/2008 | Pope |
| 2008/0292748 | A1 | 11/2008 | Sato et al. |
| 2008/0317930 | A1 | 12/2008 | Duffy et al. |
| 2009/0053785 | A1 | 2/2009 | Kelley et al. |
| 2009/0169691 | A1 | 7/2009 | Duan et al. |
| 2009/0199866 | A1 | 8/2009 | Kirkpatrick |
| 2011/0028767 | A1 | 2/2011 | Kikuchi et al. |
| 2011/0244092 | A1 | 10/2011 | Kelleher et al. |
| 2013/0330792 | A1 | 12/2013 | Takeuchi et al. |
| 2014/0127354 | A1 | 5/2014 | Pratt et al. |
| 2014/0127366 | A1 | 5/2014 | Vason et al. |
| 2014/0142352 | A1 | 5/2014 | Dauner et al. |
| 2014/0335226 | A1 | 11/2014 | Bell |
| 2016/0288022 | A1 | 10/2016 | Wright et al. |
| 2018/0112161 | A1 | 4/2018 | De Schutter et al. |

FOREIGN PATENT DOCUMENTS

| | | |
|---|---|---|
| CN | 101705165 A | 5/2010 |
| CN | 107849503 A | 3/2018 |
| DE | 2437404 A1 | 2/1975 |
| EP | 0 593 566 B1 | 2/1997 |
| EP | 3101114 | 12/2016 |
| JP | 2006109830 A | 4/2006 |
| KR | 10-2010-0084156 A | 7/2010 |
| PT | 105 008 A | 3/2013 |
| WO | 9612788 A1 | 5/1996 |

OTHER PUBLICATIONS

Coote et al., "The Content of Some Organic Acids in Beer and Other Fermented Media", Sep. 1974, Journal of the Institute of Brewing, vol. 80, No. 5, p. 474-483 (10 pages).

Notice of Summons to Attend Oral Proceedings, dated Mar. 9, 2023, in related European Application No. 19755509.7 filed Sep. 2, 2021 (7 pages).

J.B. South, Variation in pH and Lactate Levels in Malts, May-Jun. 1996, pp. 155-159, vol. 102, J. Inst. Brew., Burton-on-Trent, United Kingdom (5 pages).

Supplemental International Search Report and Written Opinion by the Korean Patent Office (KIPO), publicly available Feb. 20, 2020, for related International Application No. PCT/US2019/046308, filed Aug. 13, 2019 (17 pages).

Supplemental International Search Report and Written Opinion by the Chinese Patent Office (CNIPA), publicly available Feb. 20, 2020, for related International Application No. PCT/US2019/046308, filed Aug. 13, 2019 (9 pages).

Supplemental International Search Report and Written Opinion by the Japanese Patent Office (JPO), publicly available Feb. 20, 2020, for related International Application No. PCT/US2019/046308, filed Aug. 13, 2019 (9 pages).

Supplemental International Search Report and Written Opinion by the USPTO, publicly available Feb. 20, 2020, for related International Application No. PCT/US2019/046308, filed Aug. 13, 2019 (8 pages).

Barnes, "The Complete Beer Fault Guide, v. 1.4", 2011, © Thomas Barnes, obtained from http://www.carolinabrewmasters.com/PDF/Complete_Beer_Fault_Guide.pdf (42 pages).

Dostalek, et al., "Immunochemical determination of gluten in malts and beers", Nov. 2006, Food Additives and Contaminants vol. 23 No. 11, pp. 1074-0178 (5 pages).

Written Opinion by the European Patent Office as International Preliminary Examining Authority, dated Jul. 13, 2020, from related International Application No. PCT/US2019/046308 filed Aug. 13, 2019 (9 pages).

International Search Report and Written Opinion by the European Patent Office, dated Nov. 6, 2019, from related International Application No. PCT/US2019/046308 filed Aug. 13, 2019 (15 pages).

G.C. Whiting, Organic and Metabolism of Yeasts During Fermentation of Alcoholic Beverages—A Review, Mar.-Apr. 1976, pp. 84-92, vol. 82, J. Inst. Brew., Bristol, United Kingdom (9 pages).

Written Opinion by the European Patent Office as International Preliminary Examining Authority, dated Oct. 27, 2020, from corresponding International Application No. PCT/US2019/046308 filed Aug. 13, 2019 (10 pages).

International Preliminary Report on Patentability (Chapter II) by the European Patent Office, dated Nov. 30, 2020, from related International Application No. PCT/US2019/046308 filed Aug. 13, 2019 (9 pages).

First Office Action dated Sep. 26, 2023 in related Japan Application No. 2022-506368 filed Jan. 28, 2022 (3 pages) with JPO machine translation (4 pages).

First Office Action dated Oct. 3, 2023 in related Taiwan Application No. 108128766 filed Aug. 13, 2019 (8 pages) with Google machine translation (5 pages).

First Office Action dated Oct. 31, 2023 in related China Application No. 201980099042.6 filed Jan. 29, 2022 (4 pages) with English translation (7 pages).

European Search Report, dated Dec. 8, 2023, from European Application No. 23208187.7 filed Nov. 7, 2023 (11 pages).

European Search Report, dated Dec. 19, 2023, from European Application No. 23201842.4 filed Oct. 5, 2023 (10 pages).

Chahine, Soleil, "Effect of climatic condistions on organic acid composition of some wines obtained from different sources", AIMS Agriculture and Food, vol. 4(1), Jan. 2019, pp. 27-40 (14 pages).

\* cited by examiner

REFINED FERMENTED BEVERAGES, AND A METHOD THEREOF

CROSS-REFERENCE TO RELATED APPLICATIONS

The instant application is a continuation-in-part of U.S. patent application Ser. No. 16/101,797 filed Aug. 13, 2018, which claims the benefit of U.S. Provisional Application No. 62/544,261 filed Aug. 11, 2017, and the instant application is a continuation of International Application No. PCT/US2019/046308 filed Aug. 13, 2019, which claims the benefit of U.S. Provisional Application No. 62/880,827 filed Jul. 31, 2019, and is a continuation-in-part of U.S. patent application Ser. No. 16/101,797 filed Aug. 13, 2018, the disclosures of which are hereby incorporated by reference in their entireties.

FIELD OF THE INVENTION

The present invention relates to the production of a fermented beverage.

BACKGROUND OF THE INVENTION

Traditional fermented beverage (FB) making processes undergo several treatment steps to convert malted barley and other grains into a sugar extract that can be fermented to create a drinkable product. One example of an FB is a neutral malt base (NMB), an ideally colorless, flavorless, and odorless solution that can be further processed to formulate malt beverages of varying flavors. Such processes are described in detail in U.S. Pat. Nos. 4,440,795, 5,294,450, 5,618,572, and 7,008,652, as well as U.S. Patent Publication 2014/0127354, the disclosures of which are incorporated by reference in their entireties. However, an NMB is but one example of an FB, and other examples of FBs include, but are not limited to: beers, wines, spirits, liqueurs, meads, ciders, rice wines, and fermented teas.

Beverages based on barley have been historically produced in a malt house, converting barley to malted barley, and a brewhouse, converting malt into a malt extract also known as a wort. Malting involves steeping of barley kernels to promote germination, followed by kiln drying at elevated temperatures. A brewhouse-centered process, well known to persons skilled in the art, treats the malt to break down the starches within the malt into smaller sugars consisting mostly of mono-, di-, and trisaccharides to form a wort. The wort can then be further boiled and blended in specific percentages with other sugars and added hops to produce the final fermentation substrate that can be combined with yeast to produce ethyl alcohol. After fermentation is completed, the fermented product can then be filtered, treated, and decolorized to produce an NMB.

Production of a neutral-tasting alcoholic beverage utilizing a hopped wort has been described in Canadian Patent No. 1,034,064, incorporated by reference in its entirety. The process as a starting material a low kiln malt with a soluble protein content of between 30% and 37% by weight, a moisture content of 5% to 6% and a diastase value of 150 to 240. This low kiln malt is then mixed with water at between 66° C. and 77° C., to form a mash and maintained in that temperature range to produce a wort. The thereby produced wort is then boiled for 10-40 minutes, mixed with a carbohydrate adjunct and a supplementary nitrogen source and fermented with brewer's yeast. U.S. Pat. No. 4,495,204, incorporated by reference in its entirety, also discloses production of a neutral-tasting alcoholic beverage prepared by mashing a well modified standard brewers malt, which is mixed in an amount of from 2% to 20% with a fermentable carbohydrate and water at a temperature of between 80° C. and 90° C. in an amount from 80% to 98%, to obtain a fermentable solution, which is then cooled, pitched with brewer's yeast, and fermented.

After post-fermentation processing has been completed, the consumable NMB product often has an acidic pH. The acidity of an NMB can be traced back to the mashing process of the malt that converts the starches into fermentable sugars. Typically, milled grain is mixed with hot water in a mash tun to create a cereal mash. At the high temperatures at which this process occurs, insoluble calcium salts can form, contributing to the decrease of the pH in the mash. (See South, J. B., "Variation in pH and Lactate Levels in Malts" (1996) *J. Inst. Brew.* 102: 155-159, the disclosure of which is incorporated by reference in its entirety.) The resulting worts contain a pH ranging from about 5.4 to about 5.8, depending on the malt type and calcium content. Similarly, organic acids, particularly lactic acid, which are also found in the malts, can lower the pH of the wort even further. Moreover, organic acids can also form in the batch or continuous fermentation process. (See Whiting, G C "Organic Acid Metabolism of Yeasts During Fermentation of Alcoholic Beverages—A Review" (1976) *J. Inst. Brew.* 82: 84-92, the disclosure of which is incorporated by reference in its entirety).

Conventional techniques used for processing an FB, including an NMB, generally do not affect the removal of organic acids, such as acetic acid, citric acid, lactic acid, propionic acid, or tartaric acid, which are naturally produced during fermentation. As a result, organic acids can often be found in the FB or NMB that is ultimately consumed.

SUMMARY OF THE INVENTION

The present invention provides methods and systems for making a refined FB having a reduced or negligible level of acidic congeners relative to an FB or NMB that is processed by conventional means after fermentation. Organic acids that are retained in consumable FBs, including in NMBs, defined herein as acidic congeners can affect the organoleptic properties of the fermented beverage, and particularly of an NMB.

According to the present invention, one or more of the acidic congeners may be organic acidic congeners that impart a negative effect on the aroma and/or taste of an FB. According to the present invention, reducing or removing one or more of the organic acidic congeners may improve the aroma and/or taste of the resulting FB.

According to the present invention, untreated fermentation products or FBs comprising acidic congeners, preferably organic acidic congeners, may be produced from any fermentable carbohydrate source selected from the group consisting of a cereal grain, a fruit, honey, a syrup or sap, a starchy vegetable, a sugar, and any mixture or combination thereof.

According to the present invention, an untreated FB or un-neutralized FB can refer to an FB prior to the addition of an alkaline treating agent in an amount sufficient to convert at least a portion of the acidic congener contained within the FB to the corresponding salt, while a treated FB or neutralized FB can refer to the FB that is produced after the addition of the alkaline treating agent.

According to the present invention, the fermentable carbohydrate source may be a cereal grain selected from the group consisting of barley, wheat, rye, millet, rice, sorghum, corn, and any mixture or combination thereof. According to the present invention, the cereal grain may be a gluten-free cereal grain, and can be selected from the group consisting of millet, rice, sorghum, corn, and any mixture or combination thereof. According to the present invention, the fermentable carbohydrate source may naturally have a gluten concentration in the range of 0 ppm to 20 ppm. According to the present invention, the fermentable carbohydrate source may be modified to either reduce or remove gluten until the concentration of gluten within the fermentable carbohydrate source is in the range of 0 ppm to 20 ppm. According to the present invention, the gluten concentration in a natural fermentable carbohydrate source or a modified fermentable carbohydrate source can be about 0 ppm, or at least about 1 ppm, 2 ppm, 3 ppm, 4 ppm, 5 ppm, 10 ppm, or 15 ppm, up to at least about 20 ppm.

According to the present invention, the cereal grains used to produce refined FBs according to methods and systems of the present invention can be germinated by a malting process to form a malt. According to the present invention, the malt can be further mashed to form a wort. According to the present invention, the wort can be concentrated to form an extract. However, according to the present invention, cereal grains used as a fermentable carbohydrate source do not have to undergo a malting process. Thus, according to the present invention, a cereal grain in any form can be utilized as a fermentable carbohydrate source to produce an untreated FB.

According to the present invention, the fermentable carbohydrate source may be a sugar that can be fermented completely, selected from the group consisting of L- and/or D-glucose, maltose, fructose, sucrose, invert sugar, Belgian candi sugar, brown sugar, golden syrup, maple sugar, raw sugar, and any mixture or combination thereof. According to the present invention, the fermentable carbohydrate source may be a sugar mixture in which not all of the sugars within the mixture can be fermented, selected from the group consisting of turbinado sugar, molasses, rice syrup solids, and any mixture or combination thereof. According to the present invention, the sugar can comprise any combination of completely fermentable and partially fermentable sugars described above.

According to the present invention, any untreated fermentation product or FB may be utilized in accordance with one or more of the methods and systems of the present invention, described below. Non-limiting examples of FBs include, but are not limited to: NMBs; beers; wines; meads; ciders; rice wines; and fermented teas, although one skilled in the art would understand that this list is not exhaustive. According to the present invention, the untreated fermentation product or FB may be any of the FB's defined below in the "definitions" section. According to the present invention, the FB can include one or more flavoring and/or stability agents, including hops, spices, herbs, chocolate, coffee, sweeteners, and others. According to the present invention, the FB may comprise hops or may be substantially free of hops.

According to the present invention, refined FBs, particularly refined NMBs, produced by the methods and systems below may be used to produce flavored malt beverages (FMB) with flavor profiles that may otherwise clash with organic acidic congeners that are commonly and naturally present in untreated FBs produced by conventional methods. According to the present invention, the organic acidic congeners may include lactic acid, tartaric acid, propionic acid, butyric acid, and/or acetic acid.

In an aspect of the present invention, a method is provided for producing a refined FB having a reduced or negligible level of an acidic congener, comprising the steps of: (a) treating an FB by adding an alkaline treating agent to the FB to neutralize an acidic congener present in the FB, and (b) removing at least a portion of the neutralized acidic congener from the treated FB to produce a refined FB.

In another aspect of the present invention, a method is provided for producing a refined FB having reduced or negligible levels of organic acidic congeners, comprising the steps of: (a) treating an FB comprising one or more organic acidic congeners by adding an alkaline treating agent to the FB to neutralize at least a portion of the one or more organic acidic congeners present in the FB, and (b) separating at least a portion of the neutralized organic acidic congeners from the treated FB to produce a refined FB. According to the present invention, substantially all of the organic acidic congeners in the FB may be neutralized. According to the present invention, substantially all of the neutralized organic acidic congeners may be separated from the treated FB. According to the present invention, all of the organic acidic congeners in the FB may be neutralized and/or all of the neutralized organic acidic congeners may be separated from the treated FB.

In another aspect of the present invention, a method is provided for producing a refined FB having reduced or negligible levels of organic acidic congeners, comprising the steps of: (a) providing an FB comprising at least one organic acidic congener; (b) neutralizing at least a portion of the at least one organic acidic congener by titrating or adding into the FB a sufficient amount of an alkaline treating agent to convert the at least one acidic congener into an organic salt, to form a neutralized FB; and (c) filtering out at least a portion of the organic salt, thereby producing a refined FB. According to the present invention, substantially all of the organic acidic congeners may be neutralized to an organic salt. According to the present invention, substantially all of the organic salt may be filtered from the neutralized FB. According to the present invention, all of the organic acidic congeners in the FB may be neutralized to an organic salt and/or all of the organic salts may be separated from the treated FB.

In another aspect of the present invention, a method is provided for producing a refined FB in which all, or substantially all, of the organic acidic congeners are neutralized and removed from an FB solution, comprising the steps of: (a) providing an FB solution comprising at least one organic acidic congener; (b) treating the FB solution by neutralizing the at least one organic acidic congener, by adding into the FB solution a sufficient amount of an alkaline treating agent to convert some, all, or substantially all, of the at least one organic acidic congener into a salt of the organic acid congener; and (c) separating some portion, all, or substantially all of the salt of the organic acid congener from the treated FB solution, thereby producing a refined FB. According to the present invention, the sufficient amount of alkaline treating agent may neutralize the FB solution to a pH of or within the range of at least about 5.5, which can be a pH of at least any one of about 5.7, 5.9, or 6.1, and up to about 6.5, which can be a pH of up to about any one of 6.7, 6.5, 6.3 or 6.1. According to the present invention, useful in combination with any one or more of the above aspects and embodiments, the alkaline treating agent may comprise an alkali (group I) or alkaline earth (group II) metal hydroxide, preferably sodium hydroxide. According to the present invention, useful in combination with any one or more of the above aspects or embodiments, the alkaline treating agent may comprise up to about 50% food grade sodium bicarbonate by volume. According to the present invention, useful in combination with any one or more of the above aspects and embodiments, the at least one organic acidic congener may comprise one or more organic acids. According to the present invention, useful in combination with any one or more of the above aspects and embodiments, the FB solution may be a bright beer. According to the present invention, useful in combination with any one or more of the above aspects and embodiments, the step of treating the FB solution may comprise the steps of: (i) providing a contained quantity of the FB solution comprising the at least one organic acidic congener; (ii) titrating a sample of the contained quantity of FB solution with an alkaline treating agent sufficient to neutralize the at least one organic acidic congener in the sample to a salt form; and (iii) adding a quantity of an alkaline treating agent to the contained quantity of FB solution to treat the FB solution by neutralizing the at least one organic acidic congener in the contained quantity to a salt form, wherein the quantity of the added alkaline treating agent is determined based on the titration of the sample. According to the present invention, the alkaline treating agent used to treat the contained quantity of FB solution may either be the same alkaline treating agent used to titrate the sample, or may be a different alkaline treating agent in a stoichiometric-equivalent quantity. According to the present invention, useful in combination with any one or more of the above aspects and embodiments, the step of neutralizing the at least one organic acidic congener may be performed using an in-line, caustic dosing system comprising: (a) a means for supplying the FB to the caustic dosing system; (b) at least one pH meter for detecting the pH of the FB; (c) a container for the alkaline treating agent; (d) a delivery means for providing liquid communication of the alkaline treating agent between the alkaline treating container and the supplied FB; and (e) a central programmable logic controller in communication with the at least one pH meter and the alkaline treating agent delivery means. According to the present invention, using the in-line caustic dosing system, the at least one organic acidic congener in the FB solution may be neutralized according to the following steps: (i) introducing a stream of the FB into the in-line caustic dosing system; (ii) detecting the pH of the FB stream using the at least one pH meter; (iii) determining a stoichiometric quantity of the alkaline treating agent necessary to neutralize the one or more organic acidic congeners within the FB stream, using the central programmable logic controller; and (iv) dispensing the stoichiometric quantity of the alkaline treating agent from the alkaline treating agent container into the FB stream using the delivery means. According to the present invention, the in-line caustic dosing system may comprise a pH meter upstream of the delivery of the alkaline treating agent and a pH meter downstream of the delivery of the alkaline treating agent into the FB stream.

In another aspect of the present invention, a method is provided for producing a refined FB having reduced or negligible levels of organic acidic congeners, comprising the steps of: (a) providing a FB solution comprising at least one organic acidic congener; (b) treating the FB solution by neutralizing the at least one organic acidic congener, by adding into the FB solution a sufficient amount of an alkaline treating agent to convert all, or substantially all, of the at least one organic acidic congener into a salt of the organic acid congener; and (c) separating the salt of the organic acid congener from the treated FB solution, thereby producing a refined FB. According to the present invention, the sufficient amount of alkaline treating agent may neutralize the FB solution to a pH of or within the range of at least about 5.5, including a pH of at least about 5.7, 5.9, or 6.1, and up to about 6.5. According to the present invention, useful in combination with any one or more of the above aspects or embodiments, the alkaline treating agent may comprise a Group I or Group II metal hydroxide, particularly sodium hydroxide. According to the present invention, useful in combination with any one or more of the above embodiments, the alkaline treating agent may comprise up to about 50% food grade sodium bicarbonate by volume. According to the present invention, useful in combination with any one or more of the above aspects and embodiments, the at least one organic acidic congener may comprise one or more organic acids. According to the present invention, useful in combination with any one or more of the above aspects and embodiments, the FB solution may be a bright beer. According to the present invention, useful in combination with any one or more of the above aspects and embodiments, the step of separating may comprise filtering the salt of the organic acid congener from the treated FB. According to the present invention, useful in combination with any one or more of the above aspects and embodiments, the step of separating may consist of filtering the salt of the organic acid congener from the neutralized FB. According to the present invention, useful in combination with any one or more of the above aspects and embodiments, the FB may comprise at least about 10% and up to about 20%, by volume, ethyl alcohol, and the at least one organic acidic congener may comprise acetic acid. According to the present invention, useful in combination with any one or more of the above aspects and embodiments, the step of treating the FB solution may comprise the steps of: (i) providing a contained quantity of the FB solution comprising the at least one organic acidic congener; (ii) titrating a sample of the contained quantity of FB solution with an alkaline treating agent sufficient to neutralize the at least one organic acidic congener in the sample to a salt form; and (iii) adding a quantity of an alkaline treating agent to the contained quantity of FB solution to treat the FB solution by neutralizing the at least one organic acidic congener in the contained quantity to a salt form, wherein the quantity of the added alkaline treating agent is determined based on the titration of the sample According to the present invention, the alkaline treating agent used to treat the contained quantity of FB solution may either be the same alkaline treating agent used to titrate the sample, or may be a different alkaline treating agent in a stoichiometric-equivalent quantity. According to the present invention, useful in combination with any one or more of the above aspects and embodiments, the step of neutralizing the at least one organic acidic congener may be performed using an in-line, caustic dosing system comprising: (a) a means for supplying the FB to the caustic dosing system; (b) at least one pH meter for detecting the pH of the FB; (c) a container for the alkaline treating agent; (d) a delivery means for providing liquid communication of the alkaline treating agent between the alkaline treating container and the supplied FB; and (e) a central programmable logic controller in communication with the at least one pH meter and the alkaline treating agent delivery means. According to the present invention, useful in combination with any one or more of the above aspects and embodiments, using the in-line caustic dosing system, the at least one organic acidic congener in the FB solution may be neutralized according to the following steps: (i) introducing a stream of the FB into the in-line caustic dosing system; (ii) detecting the pH of the FB stream using the at least one pH meter; (iii) determining a stoichiometric quantity of the alkaline treating agent necessary to neutralize the one or more organic acidic congeners within the FB stream, using the central programmable logic controller; and (iv) dispensing the stoichiometric quantity of the alkaline treating agent from the alkaline treating agent container into the FB stream using the delivery means. According to the present invention, the in-line caustic dosing system may comprise a pH meter upstream of the delivery of the alkaline treating agent and a pH meter downstream of the delivery of the alkaline treating agent into the FB stream. Systems for neutralizing and removing organic acidic congeners from a FB, including in-line caustic dosing systems, according to the present invention are described in further detail below.

In another aspect of the present invention, a method is provided for producing a refined FB having reduced or negligible levels of acidic congeners, comprising the steps of: (a) providing an FB solution comprising an acidic congener; (b) treating the FB solution by adding an alkaline treating agent to the fermented beverage solution to neutralize at least a portion of the acidic congener; and (c) removing the neutralized acidic congener from the treated FB solution, thereby producing the refined FB. According to the present invention, refined FB has a reduced or negligible concentration of the acidic congener, preferably acetic acid, relative to the FB solution. According to the present invention, useful in combination with any one or more of the above aspects and embodiments, the neutralized acidic congener may be a salt. According to the present invention, useful in combination with any one or more of the above aspects and embodiments, the acidic congener may be an organic acid. According to the present invention, the acidic congener may be acetic acid. According to the present invention, useful in combination with any one or more of the above aspects and embodiments, the step of removing the neutralized acidic congener may comprise filtering the neutralized acidic congener from the treated fermented beverage. According to the present invention, useful in combination with any one or more of the above aspects and embodiments, the step of removing the neutralized acidic congener may consist of filtering the neutralized acidic congener from the treated fermented beverage. According to the present invention, useful in combination with any one or more of the above aspects and embodiments, the addition of the alkaline treating agent may raise the pH of the fermented beverage solution to at least about 5.5, and up to about 8.5. According to the present invention, useful in combination with any one or more of the above aspects and embodiments, the alkaline treating agent may either comprise an alkali metal hydroxide or alkaline earth metal hydroxide, preferably sodium hydroxide, or the alkaline treating agent may comprise a weak base, preferably sodium acetate. According to the present invention, useful in combination with any one or more of the above aspects and embodiments, the refined FB may have a pH in the range of about 5.8 to about 6.5. According to the present invention, useful in combination with any one or more of the above aspects and embodiments, the refined FB may comprise at least about 10% and up to about 20%, by volume, ethyl alcohol. According to the present invention, useful in combination with any one or more of the above aspects and embodiments, the refined FB may be flavorless.

According to the present invention, a refined FB produced by any of the above methods may retain a portion of the acidic congeners from the untreated FB. According to the present invention, the refined FB produced by any of the above methods may retain none, or essentially none, of the acidic congeners from the untreated FB.

According to the present invention, the refined FB produced by any of the above methods may be a beer. According to the present invention, the refined FB produced by any of the above methods may be a wine. According to the present invention, the refined FB produced by any of the above methods may be a spirit. According to the present invention, the refined FB produced by any of the above methods may be a liqueur. According to the present invention, the refined FB produced by any of the above methods may be a mead. According to the present invention, the refined FB produced by any of the above methods may be a cider. According to the present invention, the refined FB produced by any of the above methods may be a rice wine. According to the present invention, the refined FB produced by any of the above methods may be a fermented tea. According to the present invention, the fermented tea may be kombucha, as a non-limiting example. According to the present invention, the kombucha may comprise alcohol. According to the present invention, the refined FB produced by any of the above methods may be an NMB. According to the present invention, the refined FB produced by any of the above methods may be naturally gluten-free, gluten-reduced, or gluten-removed such that the concentration of gluten is in a range of about 0 ppm to about 20 ppm of gluten, preferably 0 ppm of gluten. According to the present invention, the refined FB produced by any of the above methods may be substantially free of hops. According to the present invention, the refined FB produced by any of the above methods may comprise no hops. According to the present invention, the refined FB produced by any of the above methods may be substantially free of malted barley. According to the present invention, the refined FB produced by any of the above methods may comprise no malted barley.

Using a refined NMB as an example, in an aspect of the invention, a method is provided for producing a refined NMB having reduced or negligible levels of acidic congeners, comprising the steps of: (a) providing a bright beer comprising at least one acidic congener; (b) titrating or adding into the bright beer an alkaline treating agent to convert at least a portion of the at least one acidic congener into a salt, to form a neutralized bright beer; and (c) separating some or all of the salt from the neutralized bright beer, thereby producing a refined NMB. According to the present invention, all of the at least one acidic congener may be neutralized. According to the present invention, all of the salt may be separated from the neutralized bright beer. According to the present invention, the acidic congener may be an organic acidic congener. According to the present invention, the separation of the salt from the neutralized bright beer may comprise filtration. According to the present invention, the separation of the salt from the neutralized bright beer may consist of filtration. According to the present invention, any of the other refined FBs described above or in the "definitions" section below can be produced simply by substituting in the desired untreated FB for the bright beer in step (a), above, and performing the same steps of neutralizing at least a portion of the at least one acidic congener to form a salt and separating out some or all of the salt.

According to the present invention, a refined FB is an FB in which a portion or all of one or more acidic congeners within an FB have been neutralized by an alkaline treating agent to form a salt, and a portion or all of the salt is subsequently removed from the neutralized FB to produce the refined FB. This application is related to and claims priority of U.S. Non-Provisional application Ser. No. 16/101,797 and U.S. Provisional Application No. 62/880, 827, both of which have described and claimed the same process for neutralizing some or all of acidic compounds within an FB to form a salt, followed by removing a portion or all the formed salts to form a clarified FB. However, "clarified" typically is the general term within the brewing industry to describe an FB produced by any process in which solids are removed from a wort, beer, or other FB. Thus, according to the present invention, a refined FB may also be described as a clarified FB, such as when the salts are removed using a separation technique or apparatus that also removes solid particulates, or when an FB that is first clarified with regard to solid material is then subsequently neutralized and refined. Additionally, according to the present invention, a refined FB may be formed by removing the salts from the treated or neutralized FB without necessarily removing any or all other solids that are present, thus producing a refined FB that is not a clarified FB. According to the present invention, an FB that has been refined, but not clarified, can subsequently be clarified to form a clarified (and refined) FB. Separation apparatuses and techniques used to form refined and clarified FBs are described in further detail, below.

According to the present invention, alternatively, neutralized acidic congeners, organic acidic congeners, and/or their salts can be optionally retained, without subsequently separating, filtering, or otherwise removing them from the neutralized FB. According to an aspect of the present invention, a method is provided for producing a neutralized FB having reduced or negligible levels of organic acidic congeners, comprising the steps of: (a) providing an FB comprising at least one organic acidic congener; and (b) titrating or adding into the FB a sufficient amount of an alkaline treating agent to neutralize at least a portion of the one or more organic acidic congeners present in the FB and form the neutralized FB. Without being limited by a particular theory, it is believed that organic acidic congeners can only be detected by taste when the organic acidic congeners are in their acidic form, whereas organic acidic congeners that have been neutralized have a diminished or negligible effect on taste, even if the neutralized organic acidic congeners and/or their salts are still present within the FB. The effect that acidic congeners have on the taste and smell of FB's is described in more detail, below.

According to the present invention, the above methods may produce a refined FB having reduced or negligible levels of acetic acid, which, if present, may impart vinegar-like flavor and odor notes that are often undesired in an FMB. According to the present invention, the refined FB may be colorless and may have decreased vinegar-like flavor notes and odors relative to untreated bright beers or FBs. According to the present invention, vinegar-like flavor notes and/or odors within the refined FB may be substantially imperceptible to someone drinking or smelling the beverage. According to the present invention, the refined FB may comprise no vinegar-like flavor notes and/or odors. According to the present invention, the refined FB may be an NMB.

The alkaline treating agent can comprise any basic compound that is capable of reacting with an organic acidic congener, including both strong and weak bases. According to the present invention, the alkaline treating agent may be a caustic comprising at least one Arrhenius base that increases the concentration of hydroxide ions in a solution with water. Non-limiting examples include alkali (Group I) and alkaline earth (Group II) metal hydroxides such as potassium hydroxide, sodium hydroxide, barium hydroxide, cesium hydroxide, strontium, hydroxide, calcium hydroxide, lithium hydroxide, and rubidium hydroxide. According to the present invention, the alkaline treating agent may comprise up to about 50% by weight sodium hydroxide. According to the present invention, the alkaline treating agent may comprise up to 50% by weight potassium hydroxide.

According to the present invention, the alkaline treating agent may comprise a weak base, in which the base and its conjugate acid are present in an equilibrium with each other. According to the present invention, the alkaline treating agent may comprise up to 50% by weight sodium bicarbonate.

According to the present invention, the alkaline treating agent can comprise one or more caustics, one or more weak bases, and/or a combination of one or more caustics and one or more weak bases.

In an aspect of the invention, a method is provided for neutralizing at least one organic acidic congener in an FB solution, which can include a bright beer solution, comprising the steps of: (1) providing a quantity of a stream of FB containing at least one organic acidic congener; (2) introducing a neutralizing quantity of an alkaline treating agent into the FB stream, to adjust the pH of the FB stream into and within a target pH range sufficient to neutralize at least a portion of the organic acidic congeners within the FB stream; (3) detecting the pH of the treated FB stream; and (4) adjusting the neutralizing quantity of the alkaline treating agent based on the detected pH of the treated FB stream, to maintain the pH of the treated FB within the target pH range.

According to the present invention, the quantity of the stream of FB may have a mass or volumetric flow rate, and the neutralizing quantity of an alkaline treating agent may have a mass or volumetric flow rate. According to the present invention, the mass or volumetric flow rate of the FB stream may be substantially constant. According to the present invention, the mass or volumetric flow rate of the FB stream may be detected, and the adjusting of the neutralizing quantity of the alkaline treating agent may be based on the detected pH of the treated FB and the mass or volumetric flow rate of the bright FB.

According to the present invention, the step of treating the FB to neutralize an acidic congener present in the FB, may comprise the steps of: (i) providing a batch of the fermented beverage solution comprising the acidic congener; (ii) extracting a sample of the fermented beverage solution from the batch; (iii) titrating the sample with an alkaline treating agent to neutralize at least a portion of the acidic congener within the sample to form a salt; (iv) calculating the amount of the salt formed by the titration of alkaline treating agent into the sample; (v) determining a quantity of alkaline treating agent to add to the batch, based on the titration of alkaline treating agent into the sample; and (vi) adding the determined quantity of alkaline treating agent to the batch to neutralize at least a portion of the acidic congener within the batch and form a salt. According to the present invention, the alkaline treating agent used to treat the contained quantity of FB can be the same alkaline treating agent used to titrate the sample, or can be a different alkaline treating agent in a stoichiometric-equivalent quantity.

According to the present invention, the step of neutralizing the at least one organic acidic congener may be performed in batch (or continuous batch) system, comprising: (a) container for a quantity of FB comprising an acid congeners; (b) a pH meter for detecting the pH of the contained quantity of FB; (c) a metering means for introducing a controlled amount of an alkaline treating agent into the contained quantity of FB; and (d) a controller, for example a central programmable logic controller, in communication with the pH meter and the metering means. The metering means can be a metering pump or a liquid flow controller.

According to the present invention, the step of neutralizing the at least one organic acidic congener may be performed in an in-line, caustic dosing system, comprising: (a) a piping system for FB streams; (b) one or more pH meters for detecting the pH of the FB stream, or one or more pH meters for detecting the pH of the treated FB stream, or both; (c) an alkalinity container for the alkaline treating agent; (d) a metering means for introducing a controlled amount of the alkaline treating agent into the FB stream; and (e) a controller, for example a central programmable logic controller, in communication with the one or more pH meter and the metering means. The metering means can be a metering pump or a liquid flow controller. In some embodiments, the in-line, caustic dosing system further comprises mixing means for homogenizing the alkaline treating agent into the FB stream. The mixing means can comprise an in-line mixer, a retention piping, and in-line mixing vessel, or a recirculation system.

According to the present invention, the in-line, caustic dosing system may further comprise a conductivity meter for detecting the electrical conductivity of the FB stream, or the treated FB stream, or both.

According to the present invention, the at least one organic acidic congener in the FB may be neutralized within the in-line caustic dosing system according to the steps of: (1) introducing the FB stream comprising an organic acid into the in-line caustic dosing system; (2) detecting the pH of the FB stream using a pH meter; (3) determining a neutralizing quantity of the alkaline treating agent sufficient to neutralize the organic acidic congeners within the FB stream, using the controller; and (4) dispensing the neutralizing quantity of the alkaline treating agent from the alkalinity container into the FB stream downstream of the detection by the pH meter using a metering means, to form the treated FB stream. According to the present invention, the in-line caustic dosing system can comprise a pH meter for detecting the pH of the FB stream at a position downstream of where the alkaline treating agent is introduced and mixed into the FB stream or for detecting the pH of the treated FB stream, or both. The detected pH of the treated FB stream may be used by the controller to determine the sufficient neutralizing quantity of alkaline treating agent.

According to the present invention, any of the above methods for neutralizing the FB using the in-line caustic dosing system can further comprise the step of detecting the electrical conductivity of the FB stream using the conductivity meter. According to the present invention, the detected conductivity of the treated FB stream may be used by the controller to determine the sufficient neutralizing quantity of alkaline treating agent. According to the present invention, the detected conductivity and pH of the treated FB stream may both be used by the controller to determine the sufficient neutralizing quantity of alkaline treating agent.

According to the present invention, any of the neutralization methods described above can further include one or more salt removal or separation steps that can be performed after neutralizing the organic acidic congeners within the FB, to remove the salt forms of the organic acid congeners generated during the neutralization. According to the present invention, the removal step may comprise a filtering step, and passing the treated FB through a filter to separate and remove the salt forms of the organic acid congeners. Typically, a suitable filter can include a filter or separate device sufficient for the desalination of sea water. Non-limiting examples of the inventive filtration systems for separation of salts from the neutralized FB to form a refined FB may include: ultrafiltration; reverse osmosis filtration; and nanofiltration. According to the present invention, the method can also include filtration of the FB prior to neutralizing the organic acidic congeners within the FB, to remove other particulates or filterable congeners. According to the present invention, the separation may comprise a separation step in addition to or substituting for filtration, including but not limited to: column distillation; vacuum distillation; multi-stage flash distillation; multiple-effect distillation; vapor-compression distillation; ion exchange chromatography, particularly cation exchange chromatography; gravitation; centrifugation; decantation; freeze-thaw systems; solar evaporation systems; and electrodialysis reversal. According to the present invention, removing at least a portion of the salt forms of the organic acid congeners may form a refined FB.

According to the present invention, the salt forms of the organic acid congeners may be separated from the treated FB stream to form a refined FB, without using distillation. According to the present invention, salt forms of the organic acid congeners may be removed from the treated FB stream using filtration only.

The present invention can also include refined spirit and a method for its making, wherein a fermented beverage comprising ethanol and acidic congeners is neutralized to convert at least a portion of the acidic congeners to a salt form, and the neutralized fermented beverage is subsequently distilled to separate the ethanol from the salt form, forming a potable refined spirit. The refined spirit has a reduced or negligible level of the acidic congener in the distillate, that improves organoleptic properties. According to the present invention, a refined FB can be distilled after filtering out a salt form of at least a portion of the acidic congeners, in order to separate the ethanol, along with water in the form of an azeotrope, from any trace organic acid congeners or neutralized salt forms of the organic acid congeners, or other water-miscible congeners, that remain after filtration.

According to the present invention, and without being limited by another theory, it is believed that distilling after neutralization, with or without filtering, removes vinegar-like flavors and aromas from the FB and achieves an overall improved taste profile for the refined spirit, as compared to a distilled spirit made by directly distilling a bright beer. According to the present invention, the titratable acidity of a refined spirit may be less than the titratable acidity of a distilled spirit that has not been neutralized. According to the present invention, the titratable acidity of the refined spirit as associated with acetic acid may be less than the titratable acidity of a distilled spirit that has not been neutralized. According to the present invention, the titratable acidity of the refined spirit may be less than about 0.3 gram per liter (g/L), including less than about 0.2, 0.1, or 0.05, down to less than about 0.01 g/L. According to the present invention the titratable acidity of the refined spirit may be essentially zero or undetectable.

Thus, according to one aspect of the present invention, a method for producing a refined spirit having reduced or negligible levels of organic acidic congeners can comprise the steps of: (a) providing an FB comprising ethanol and at least one organic acidic congener; (b) titrating or adding into the FB an alkaline treating agent to convert at least a portion of the at least one acidic congener into an organic salt to form a neutralized FB; and (c) distilling the ethanol from the neutralized FB containing the organic salts of the acidic congener, thereby producing a refined spirit. According to the present invention, the method for producing a refined spirit further may comprise the step of filtering at least a portion of the organic salt from the neutralized FB, prior to the distillation step. According to the present invention, the FB comprising ethanol that may be used to produce the refined spirit may be a beer.

According to the present invention, a spirit prepared and distilled by conventional processes can contain a residual amount of one or more acidic or organic acidic congeners that were present in an FB prior to its distillation. In an aspect of the present invention, a method for producing a refined spirit having reduced or negligible levels of organic acidic congeners is provided, comprising the steps of: (a) providing a distilled beverage comprising ethanol and at least one organic acidic congener; (b) titrating or adding into the distilled beverage an alkaline treating agent to convert at least a portion of the at least one acidic congener into an organic salt to form a neutralized distilled beverage; and (c) separating at least a portion of the organic salt from the neutralized distilled beverage to produce a refined spirit. According to the present invention, the separation of the organic salt from the neutralized distilled beverage may comprise filtration. According to the present invention, the separation of the organic salt from the neutralized distilled beverage may consist of filtration. According to the present invention, the separation of the organic salt from the neutralized distilled beverage may comprise a second distillation. According to the present invention, the separation of the organic salt from the neutralized distilled beverage may comprise a filtration and a second distillation. According to the present invention, all of the organic acidic congeners may be separated from the neutralized distilled beverage to form the refined spirit.

In another aspect of the present invention, the invention may also provide a neutralization system for neutralizing and removing organic acidic congeners in an FB, to produce a refined FB, comprising: (a) an in-line caustic dosing system configured treat the FB by titrating or adding an alkaline treating agent to the FB to neutralize the organic acid congeners; and (b) at least one separation apparatus configured to separate the neutralized organic acid congeners from the treated FB, thereby producing the refined FB.

In another aspect of the present invention, the neutralization system can comprise: (a) an in-line caustic dosing system for neutralizing the organic acidic congener in the bright beer stream; and (b) a filter or other device for separating out the salt forms of the organic acidic congeners from the treated FB stream.

According to the present invention, useful in combination with any one or more of the above neutralization systems, the in-line caustic dosing system can comprise: one or more pH meters configured for monitoring the pH of the FB stream, the treated FB stream, or both; a container for an alkaline treating agent; a metering means for the alkaline treating agent; and a central programmable logic controller that is configured to monitor the pH of the FB stream, the treated FB stream, or both, detected by the one or more pH meter, and to control the amount of the alkaline treating agent dispensed from the container by the metering means.

According to the present invention, the amount of alkaline treating agent that may be titrated into the FB in any of the methods or systems described above may be the amount sufficient to neutralize at least about 10 percent of the organic acidic congeners that were present in the FB, up to at least about 99.9 percent of the organic acidic congeners that were present in the FB. According to the present invention, enough alkaline treating agent may be titrated into the FB so that all, or substantially all, of the organic acidic congeners that were present within the FB are neutralized. According to the present invention, enough alkaline treating agent may be titrated into the FB so that less than about 99.9 percent of the organic acidic congeners that were present in the FB, down to less than about 25 percent of the organic acidic congeners that were present in the FB, are neutralized. According to the present invention, from about 90 percent up to about 99 percent of the acidic congeners that were present in the FB may be neutralized.

Similarly, the amount of the organic acidic congeners that are neutralized can be controlled by the amount of an alkaline treating agent, particularly sodium hydroxide, that is added to the FB to attain a target pH that is maintained within the neutralized or treated FB. According to the present invention, the target pH of the treated or neutralized FB may be at least about 5.0, up to at least about 8.7. According to the present invention, the target pH of the treated or neutralized FB may be less than about 8.7, down to less than about 5.0. According to the present invention, the target pH of the treated or neutralized FB may be from about 5.5 up to about 7.0. According to the present invention, the target pH of the treated or neutralized FB may be from about 5.8 up to about 6.5. According to the present invention, any two pH values listed above between and inclusive of 5.0 and 8.5 can be selected to form a target pH range for the neutralization of an FB, without departing from the spirit of the invention.

According to the present invention, when distillation is used during a removal or separation step during the production of a refined spirit, either on its own or in combination with one or more filters, the target pH of the treated or neutralized FB when making a refined spirit may be at least about 5.0, up to at least about 8.7. According to the present invention, the target pH of the treated or neutralized FB when making a refined spirit may be less than about 8.7, down to less than about 5.0. According to the present invention, the target pH of the treated or neutralized FB when making a refined spirit may be in a range from about 5.5 up to about 7.0. According to the present invention, the target pH of the treated or neutralized FB when making a refined spirit may be in a range from about 5.8 up to about 6.5. According to the present invention, any two pH values listed above between and inclusive of 5.0 and 8.5 may be selected to form a target pH range for the neutralization of an FB to form a refined spirit, without departing from the spirit of the invention.

According to the present invention, regardless of whether an untreated FB, clarified FB, treated FB, or neutralized FB has been distilled, the refined FB may have a pH of at least about 5.0, up to at least about 8.7. According to the present invention, the pH of the refined FB may be less than about 8.7, down to less than about 5.0. According to the present invention, the pH of the refined FB may be in a range from about 5.5 up to about 7.0. According to the present invention, the pH of the refined FB may be in a range from about 5.5 up to about 6.5. According to the present invention, the pH of the refined FB may be in a range from about 5.8 up to about 6.5. According to the present invention, the refined FB may have a pH in a range between any two pH values listed above, between and inclusive of 5.0 and 8.5, without departing from the spirit of the invention.

According to the present invention, based on the $pK_a$ of the organic acids present in the FB, the amount of alkaline treating agent that is titrated into the FB may be the amount sufficient to raise the pH enough to cause at least about 10 percent of the organic acids, which can be at least about 25, or at least about 50, or at least about 60, or at least about 70, or at least about 75, or at least about 80, or at least about 85, or at least about 90, or at least about 95, or at least about 96, or at least about 97, or at least about 98, or at least about 99, or at least about 99.5, or at least about 99.9 percent, of the organic acids to be present in their conjugate base form in the treated FB upon their neutralization. According to the present invention, the amount of alkaline treating agent that is titrated into the FB may be the amount sufficient to raise the pH enough to cause less than about 99.9 percent of the organic acids, which can be less than about 99.5, or less than about 99, or less than about 98, or less than about 97, or less than about 96, or less than about 95, or less than about 90, or less than about 85, or less than about 80, or less than about 75, or less than about 70, or less than about 60, or less than about 50, or less than about 25, or less than about 10 percent, of the organic acids to be present in their conjugate base form in the treated FB upon their neutralization. According to the present invention, from about 80 percent up to about 99.9 percent of the organic acids within the treated FB may be in their conjugate base form. According to the present invention, from about 90 percent up to about 99 percent of the organic acidic congeners within the treated FB may be in their conjugate base form. According to the present invention, from about 92 percent up to about 97 percent of the organic acidic congeners within the treated FB may be in their conjugate base form. According to the present invention, about 95 percent of the organic acidic congeners within the treated FB may be in their conjugate base form. Similarly, according to the present invention, at least about 10 percent of the organic acids that are present in their conjugate base form as a salt upon neutralization, which can be at least about 25, or at least about 50, or at least about 60, or at least about 70, or at least about 75, or at least about 80, or at least about 85, or at least about 90, or at least about 95, or at least about 96, or at least about 97, or at least about 98, or at least about 99, or at least about 99.5, or at least about 99.9 percent, may be separated and removed from the treated FB when forming a refined FB, using any of the filtration, distillation, and/or separation apparatuses described above. According to the present invention, less than about 99.9 percent of the organic acids that are present in their conjugate base form as a salt upon neutralization, which can be less than about 99.5, or less than about 99, or less than about 98, or less than about 97, or less than about 96, or less than about 95, or less than about 90, or less than about 85, or less than about 80, or less than about 75, or less than about 70, or less than about 60, or less than about 50, or less than about 25, or less than about 10 percent, may be separated and removed from the treated FB when forming a refined FB, using any of the filtration, distillation, and/or separation apparatuses described above. According to the present invention, from about 80 percent up to about 99.9 percent of the salts may be removed from the treated FB after neutralization. According to the present invention, from about 90 percent up to about 99 percent of the salts may be removed from the treated FB after neutralization. According to the present invention, from about 92 percent up to about 97 percent of the salts may be removed from the treated FB after neutralization. According to the present invention, about 95 percent of the salts may be removed from the treated FB after neutralization.

According to the present invention, any of the methods or systems described above may be targeted toward the neutralization of one or more selected organic acid congeners. According to the present invention, the method or process may be utilized to neutralize and/or remove acetic acid as an acidic congener. Upon addition of an alkaline treating agent, acetic acid is subsequently neutralized to a salt with its conjugate base, acetate. By comparing the pH of the treated FB to the $pK_a$ of acetic acid, the relative abundance of the acetate salt compared to acetic acid in the treated FB can be calculated. According to the present invention, the relative abundance of the acetate salt compared to acetic acid in the treated FB may be at least about 50:50, up to at least about 99.9:0.1. According to the present invention, the relative abundance of acetate salt to acetic acid within the treated FB may be from about 90:10 up to about 99:1. According to the present invention, all, or substantially all, of the acetic acid within the FB may be neutralized to an acetate salt. According to the present invention, all, or substantially all, of the acetic acid may be neutralized when the pH of the FB is raised to at least 8.7.

According to the present invention, the amount of alkaline treating agent that is added to the FB may be an amount sufficient to diminish vinegar-like tastes and/or odors resulting from the presence of acetic acid within the FB. According to the present invention, the amount of alkaline treating agent that is added to the FB may be an amount sufficient to cause the vinegar-like taste from acetic acid to be substantially imperceptible. According to the present invention, the amount of alkaline treating agent that is added to the FB may be an amount sufficient to cause the vinegar-like odors from acetic acid to be substantially imperceptible. According to the present invention, the amount of alkaline treating agent that is added to the FB may be an amount sufficient to cause the resulting treated or neutralized FB to be organoleptically pure.

According to the present invention, the alcohol content (ABV) of the refined FB produced by any of the above neutralization methods or systems without using distillation is at least about 0.05 percent by volume, up to at least about 65 percent by volume. According to the present invention, the ABV of the refined FB is less than or equal to about 65 percent by volume, down to less than or equal to about 0.1 percent by volume. According to the present invention, trace amounts of alcohol can be retained within a refined FB, having an ABV of less than 0.05 percent by volume. According to the present invention, the ABV of the refined FB is from about 4 percent by volume, up to about 20 percent by volume. According to the present invention, the ABV of the refined FB is from about 10 percent by volume up to about 20 percent by volume. According to the present invention, the ABV of the refined FB can be in a range between and inclusive of any two of the ABV values listed above between 0.05 percent by volume and 65 percent by volume, without departing from the spirit of the invention.

According to the present invention, the ABV of a refined spirit produced by any of the above neutralization methods or systems is at least about 5 percent by volume, up to at least about 95 percent by volume. According to the present invention, the ABV of a refined spirit is less than or equal to about 95 percent by volume, down to less than or equal to about 8 percent by volume. According to the present invention, a small amount of alcohol can be retained within a refined spirit, having an ABV of less than 5 percent by volume. According to the present invention, the ABV of the refined spirit can be in a range between and inclusive of any two of the ABV values listed above between 5 percent by volume and 95 percent by volume, without departing from the spirit of the invention.

In another aspect of the present invention, a refined FB is provided that comprises the following properties: (a) a pH in the range of 5.5 to 8.5, preferably 5.8 to 6.5; and/or (b) at least 10%, and up to 20%, by volume, ethyl alcohol; and/or (c) a combined concentration of acetic acid and acetate less than 1000 ppm. According to the present invention, a refined FB may have a titratable acidity, relative to acetic acid, of less than about 0.5 grams per liter of the refined FB, preferably less than about 0.25 grams per liter, and a protonated acetic acid concentration of less than about 100 parts per million, preferably less than about 50 parts per million, and more preferably less than 25 parts per million. According to the present invention a refined FB may have no measurable protonated acetic acid and or titratable acidity relative to acetic acid. According to the present invention, the refined FB may be a naturally-gluten free, gluten-reduced, or gluten removed FB comprising gluten in a range of 0 ppm to 20 ppm of gluten, preferably 0 ppm of gluten. According to the present invention, the gluten concentration in the refined FB may be about 0 ppm, or at least about 1 ppm, 2 ppm, 3 ppm, 4 ppm, 5 ppm, 10 ppm, or 15 ppm, up to at least about 20 ppm. According to the present invention, the refined FB may be a beer. According to the present invention, the refined FB may be a wine. According to the present invention, the refined FB may be a spirit. According to the present invention, the refined FB may be a liqueur. According to the present invention, the refined FB may be a mead. According to the present invention, the refined FB may be a cider. According to the present invention, the refined FB may be a rice wine. According to the present invention, the refined FB may be a fermented tea. According to the present invention, the fermented tea may be kombucha, as a non-limiting example. According to the present invention, the kombucha may comprise alcohol. According to the present invention, the refined FB may be an NMB. According to the present invention, the refined FB may further be any of the FBs listed in the "Definitions" section, below. According to the present invention, the refined FB may further be a clarified version of any of the FBs listed in the "Definitions" section, below. According to the present invention, any of the above refined FBs may be produced according to any of the methods and/or systems described above. According to the present invention, any of the above refined FBs may comprise any of the properties of any of the refined FBs produced according to any of the methods and/or systems described above.

These and other embodiments of the present invention will be apparent to one of ordinary skill in the art from the following detailed description.

DETAILED DESCRIPTION OF THE INVENTION

Definitions

Figure 1:
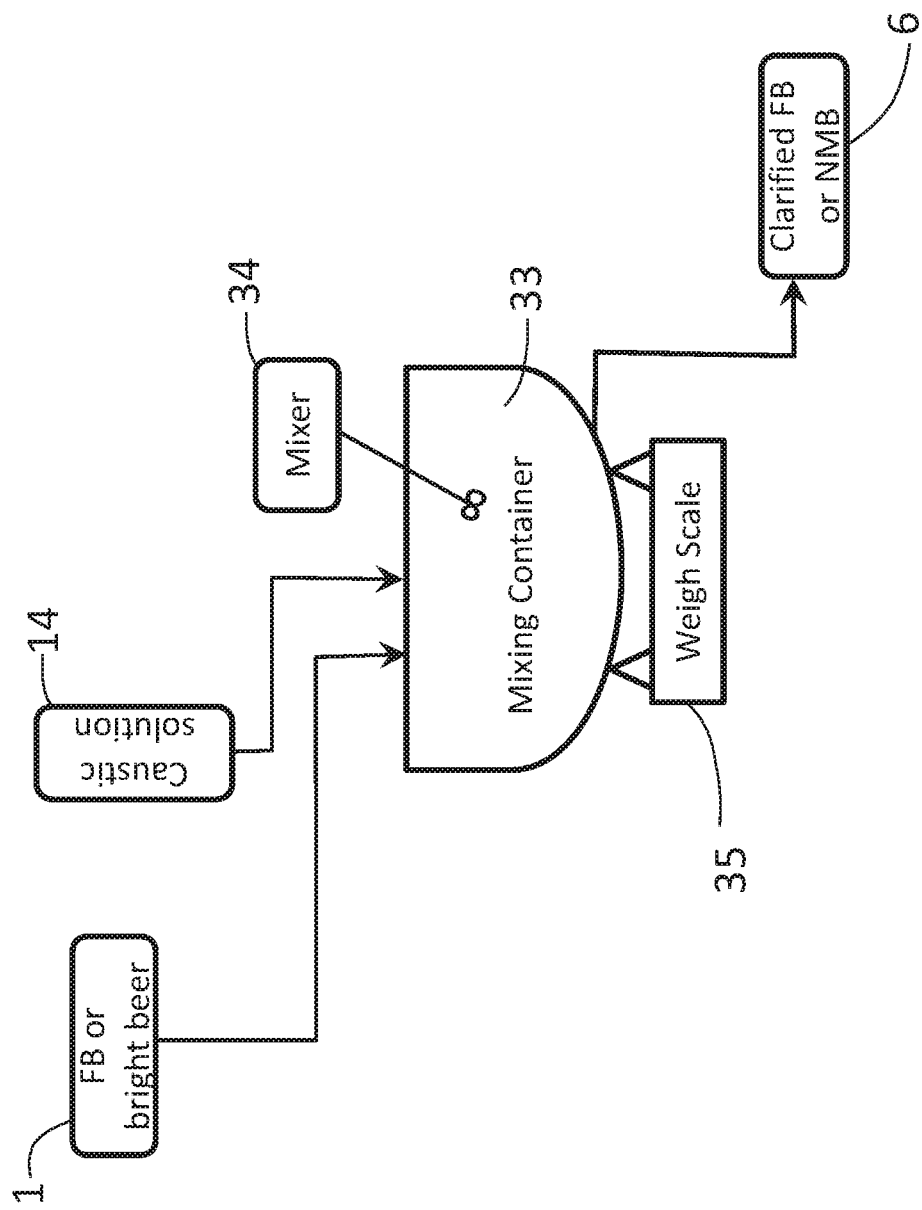
FIG. 1 shows a schematic diagram of a caustic dosing system and process for neutralizing organic acids in an FB solution, using a batch neutralizing system.

As used herein, the term, "and/or" when used in the context of a listing of entities, means the entities being present singly or in combination. Thus, for example, the phrase "A, B, C, and/or D" includes A, B, C, and D individually, but also includes any and all combinations and sub-combinations of A, B, C, and D.

As used herein, the terms, "bright beer" or "brite beer" means the crude, beverage-grade, ethyl alcohol-containing, liquid product of fermentation, after yeast has been decanted, filtered, or otherwise removed, and the term "treated bright beer" refers to the solution of bright beer after neutralizing or treatment with an alkaline treating agent.

As used herein, the term, "caustic" means a compound that dissociates completely to yield hydroxide ions upon interacting with water to form a solution that has a strongly basic pH. Such compounds include, but are not limited to Group I and Group II hydroxides such as potassium hydroxide, sodium hydroxide, barium hydroxide, cesium hydroxide, strontium, hydroxide, calcium hydroxide, lithium hydroxide, and rubidium hydroxide.

As used herein, the term, "clarified," with respect to a "clarified fermented beverage," can refer to the general term within the brewing industry that describes any process in which solids are removed from a wort, beer, or other fermented beverage According to the present invention, clarification of a fermented beverage, or of a refined fermented beverage, can be achieved using any mechanical, chemical, or physical separation technique. Non-limiting examples include: ultrafiltration; reverse osmosis filtration; nanofiltration; granular activated carbon separation; column distillation; vacuum distillation; multi-stage flash distillation; multiple-effect distillation; vapor-compression distillation; ion exchange chromatography, particularly cation exchange chromatography; gravitation; centrifugation; decantation; freeze-thaw systems; solar evaporation systems; and electrodialysis reversal.

As used herein, the term "congener," is a substance, other than the desired type of alcohol, ethanol, produced during fermentation and can be present within a fermented beverage in small amounts. Examples of conventional congeners are chemicals such as methanol, acetone, acetaldehyde, esters, tannins, aldehydes and other organic compounds.

As used herein, the phrase "acidic congener" means an organic acid, examples of which can be acetic acid, lactic acid, propionic acid, tartaric acid, and butyric acid, that can have an effect on the taste or smell of the fermented beverage. The phrase "acidic congener" can refer to all of the acids or organic acids present in a fermented beverage, or it can refer to a subset of the acids or organic acids that are present, down to a single acid or organic acids.

As used herein, the term, "fermented beverage" (FB) means a liquid beverage solution that is the product of fermentation from any fermentable sugar source, typically after any yeast has been removed, whether it contains ethyl alcohol or it does not. FBs can include, but are not limited to, acidophiline, agkud, aleberry, amasi, aleberry, amazake, apo, ara, bahalina, bais, basi, beer, bignay wine, bikkle, bionade, blaand, boj, bona, brottrunk, Calpis, cauim, chhaang, Chibuku Shake Shake, chicha, cider, coyol wine, doogh, duhat wine, fassbrause, ginger beer, gouqi jiu, handia, hardaliye, huangjiu, ibwatu, intus, jabol, jun, kabarwaran, kasiri, kefir, kilju, kinutil, kombucha, kumis, kvass, kwete, lambanog, lassi, mageu, malt beverages, malt drink, matzoon, mauby, mbege, merisa, neera, nihamanchi, oshikundu, palek, palm wine, pangasii, parakaria, perry, podpiwek, pruno, pulque, purl, rejvelac, rice wine, ryazhenka, algam, sikye, tapuy, tejuino, tepache, tesgüino, thwon, tibicos, tiswin, tongba, tono, tubâ, umqombothi, wine, and žinčica. The term "fermented beverage" also includes FBs that have been distilled to form spirits.

As used herein, the term, "flavored malt beverage" (FMB) means the final malt beverage product that is formed once a neutral malt base has been filtered, treated, and processed in order to produce a consumable beverage product.

As used herein, the term, "gluten-free" means that the FB or refined FB contains substantially no gluten. Gluten-free fermented beverages (GFB) can be prepared by fermenting sugars from any fermentable sugar source, including cereal grains, that do not contain gluten. Such gluten-free cereal grains include, but are not limited to: millet, rice, sorghum, buckwheat and/or corn. According to the present invention, GFBs are prepared without malts, particularly malted barley, or hops present.

As used herein, the terms, "gluten-reduced" or "gluten-removed" mean that the FB or refined FB contains less than 20 ppm of gluten. Typically, gluten-reduced and gluten-removed FBs are prepared from barley, rye, and other fermentable sugar sources that do contain gluten, but where gluten is removed from the beverage after fermentation is completed. However, gluten-reduced and gluten-removed beverages can be prepared from fermentable sugar sources that contain minimal amounts of gluten that total to less than 20 ppm.

As used herein, the terms, "mash" or "mashing" means the process of converting the starches typically present in malts to lower-order sugar molecules, including monosaccharides, disaccharides, and trisaccharides, that are suitable for fermentation with yeast to produce an ethyl alcohol.

As used herein, the terms, "neutralize" or "neutralizing" means the neutralization of at least a portion of the acids, including organic acids, in a fermented beverage with an alkaline treating agent to form therefrom organic salts.

As used herein, the terms, "neutral malt base" (NMB) or "malt beverage base" means the ethyl alcohol-containing liquid formed as a result of filtering, treating and/or decolorizing a bright beer or other fermented beverage. According to the present invention, NMBs produced by methods and systems of the present invention are colorless, flavorless, and/or odorless.

As used herein, the term, "organoleptically pure," refers to a neutralized or refined FB in which there is substantially no perceptible taste or smell from organic acidic congeners that were originally present in the FB prior to being neutralized, even if a portion of the organic acidic congeners are still present in their acidic form after neutralization and/or separation.

As used herein, the term, "refined," with respect to a "refined fermented beverage," can refer to fermented beverages produced by methods and systems of the present invention in which a portion or all of one or more acidic congeners within a fermented beverage have been neutralized by an alkaline treating agent to form a salt, and a portion or all of the salt is subsequently removed from the neutralized fermented beverage to produce the refined fermented beverage. According to the present invention, a refined fermented beverage can be prepared from a clarified fermented beverage that has been clarified with respect to solids within a wort, beer, or other fermented beverage, but where a portion or all of the acidic congeners naturally produced during fermentation have not been removed. According to the present invention, a refined fermented beverage may be prepared from a fermented beverage in which only solids have been removed, or from a fermentation product that has not previously been clarified. According to the present invention, a fermented beverage may be clarified and refined simultaneously, so long as the separation technique or apparatus removes, in addition to the salts, solids that would typically be removed during clarification. According to the present invention, a neutralized fermented beverage may be refined to form a refined FB, without also forming a clarified FB, and the refined FB can later be clarified to form a clarified FB.

As used herein, the term, "titratable acidity," is a measurement of the total mass of titratable acids in a solution, typically expressed as grams per liter. The total mass of titratable acids includes both hydronium ions and weak acids that are still protonated, such as acetic acid ($CH_3COOH$). In the brewing industry, titratable acidity is often used to quantify the organic acids present in a given FB, GFB, gluten-reduced or gluten-removed FB, NMB, FMB, potable spirit, or other neutralized product, in order to evaluate the perceivable acidity within the beverage.

As used herein, the terms, "wort" or "malt extract" means the sugar-rich solution or mixture resulting from the mashing and/or cooking process that is suitable for fermentation with yeast to produce ethyl alcohol.

Making of a Neutral Malt Base

The present invention provides methods and systems for preparing neutralized or refined FBs from raw or untreated FBs and other fermentation products that contain a measurable level of acidic congeners, particularly organic acidic congeners. The methods presented herein generally include a step in which an alkaline treating agent is added to a fermentation product, FB, or bright beer, to react with or neutralize at least a portion of the acidic congeners within the fermentation product, FB, or bright beer, to form salts. At least a portion of the salts can then be separated from the treated bright beer or FB to produce a refined FB.

To illustrate the systems and processes of the present invention for FBs generally, an example of systems or processes to make a refined NMB from a bright beer solution or stream is described below. In some embodiments, a refined NMB is colorless, flavorless, and/or odorless, and contains a reduced or negligible level or amount of organic acidic congeners as compared to the level or amount of organic acidic congeners in untreated fermentation products and FBs. Without being limited by a particular theory, FMBs produced from the refined NMB can have a more pleasing taste profile as a result of removing organic acids that are naturally present after the brewing and fermentation process. Similarly, removing organic acids from the NMB creates a more versatile NMB to which a variety of flavoring agents can be added, particularly those that would otherwise create an unpleasant tasting FMB in combination with organic acids naturally present in a conventional NMB. Additionally, it is believed that fewer flavoring agents, particularly sugar, are needed to combine with NMBs produced by methods of the present invention, relative to NMBs that have not been neutralized by the addition of an alkaline treating agent, in order to ultimately produce an FMB of the same or comparable organoleptic quality.

Traditional methods of brewing an NMB are widely known in the art and particularly described in detail in U.S. Pat. Nos. 4,440,795, 5,294,450, 5,618,572, and 7,008,652, as well as U.S. Patent Publication 2014/0127354, the disclosures of which are incorporated by reference in their entireties. Generally, to produce a conventional NMB, a supply of malt must first be obtained. The malt may be of any conventional type known in the art which is suitable for producing beer and other brewed beverages. One non-limiting example of a suitable malt is "Brewers Malt," available from Briess Malt & Ingredients Co. The malt is then combined with deionized water and heated at high temperature to produce a mash. At this stage, the mash will contain various malt-derived fermentable sugars (e.g. including but not limited to maltose and maltotriose), which are fermentable by yeast into ethyl alcohol, as well as several malt-derived non-fermentable sugars (e.g. including but not limited to maltotetraose and maltopentaose) that cannot be broken down into ethyl alcohol by yeast.

However, during the mashing process, precipitation of phosphate and proteins from the malts can result in the formation of insoluble calcium salts, which have been strongly correlated with a decrease in the pH of the mash product. Additionally, several malt varieties contain high levels of lactate (See South, J. B. "Variation in pH and Lactate Levels in Malts" (1996) *J. Inst. Brew.* 102: 155-159, the disclosure of which is incorporated by reference in its entirety), acetate, butyrate, propionate that ultimately are transferred to the mash. For instance, South determined that the concentration of lactate in several varieties of malts ranged from 17.6 to 126.3 milligrams per 100 grams of malt (dry weight). The lactate concentration is inversely proportional to the pH of the wort, ranging from 5.59 at the highest lactate concentration to 6.02 at the lowest lactate concentration.

After the mash product has been generated, several processes known in the art can be utilized to generate a sugar-rich wort that is suitable for fermentation. Such processes include, but are not limited to, adding enzymes that are capable of breaking down the starches and/or sequentially heating the mash to catalyze chemical conversion of the starches into sugars.

Next, the mash is physically treated in order to remove solids therefrom, using any apparatus known in the brewing art for filtering mash. The liquid filtrate, which is colloquially known as the wort or malt extract, can then be collected and transferred to a brew kettle in the presence of additional fermentable sugars (e.g. dextrose, sucrose, and/or corn syrup) and optionally, "hop materials," which can encompass a wide variety of different products, including but not limited to hop cones, pre-isomerized pelletized hops, and/or solvent-extracted concentrated hop extract. Yeast can then be added to the wort to initiate fermentation, which is allowed to continue until there are no fermentable sugars remain. Typically, the fermentation process can last for 7-11 days, but the fermentation time is ultimately dependent on numerous factors, including but not limited to temperature. Warmer temperatures typically result in faster fermentation, although excessive heat can create several issues and is often avoided.

After fermentation is completed, the yeast from the alcohol-containing fermented product is allowed to settle out of the product and removed by conventional decantation or filtering techniques, forming a bright beer. Bright beer typically has a pH of about 4.0+/−0.25, based on the identity and total concentration of the organic acids that are present, and is usually colored, fragrant, and unsuitable for use in make an FMB However, acids, including organic acids, in the mash product are retained throughout the entire brew-making process, and none of the filtering or purification techniques address the role that organic acidic congeners have in contributing to undesired tastes or odors when mixed with certain flavor additives to form an FMB. In contrast, an NMB produced by any of the methods of the present invention described below can be colorless, flavorless, and/or odorless. More generally, removing acidic congeners from an FB of any type to produce a refined FB using any of the methods and systems described below can create a more pleasurable organoleptic experience for the person consuming the beverage.

Embodiments of the Invention

In one embodiment, the present invention provides a method of producing a refined FB from an FB solution comprising one or more organic acidic congeners, comprising the steps of: (a) neutralizing one or more organic acidic congeners contained in the FB solution by titrating or adding into the FB an amount of an alkaline treating agent sufficient to convert at least a portion of the one or more organic acidic congeners into its conjugate base to form an organic salt; and (b) removing the organic salt, thereby producing a refined FB. In an embodiment of the invention, the sufficient amount of alkaline treating agent is sufficient to raise the pH of the FB solution to at least about 5.0, including at least about 5.5, 5.8, 5.9, 6.0, 6.1, 6.2, 6.3, 6.5, 6.8, 7.0, 7.5, 7.8, 8.0, 8.2, or 8.5, including at least about 8.7. In some embodiments, the sufficient amount of alkaline treating agent is sufficient to raise the pH of the FB solution to less than about 8.7, including less than about 8.5, 8.2, 8.0, 7.8, 7.5, 7.0, 6.8, 6.5, 6.4, 6.3, 6.2, 6.1, 6.0, 5.9, 5.8, or 5.5, down to less than about 5.0. In some embodiments, the sufficient amount of alkaline treating agent is sufficient to raise the pH of the FB solution to a pH range from about 5.5 up to about 5.8, or 5.9, or 6.0, or 6.1, or 6.2, or 6.3, or 6.5, or 6.8, or 7.0, or 7.5, or 7.8, or 8.0, or 8.2, or 8.5. In some embodiments, the sufficient amount of alkaline treating agent is sufficient to raise the pH of the FB solution to a pH range from about 5.8 up to about 5.9, or 6.0, or 6.1, or 6.2, or 6.3, or 6.5, or 6.8, or 7.0, or 7.5, or 7.8, or 8.0, or 8.2, or 8.5. In some embodiments, the sufficient amount of alkaline treating agent is sufficient to raise the pH of the FB solution to a pH range from about 6.0 up to about 6.1, or 6.2, or 6.3, or 6.5, or 6.8, or 7.0, or 7.5, or 7.8, or 8.0, or 8.2, or 8.5. In some embodiments, the target pH of the treated or neutralized FB is from about 6.5 up to about 6.8, or 7.0, or 7.5, or 7.8, or 8.0, or 8.2, or 8.5. In some embodiments, the sufficient amount of alkaline treating agent is sufficient to raise the pH of the FB solution to a pH range between and inclusive of any two pH values listed above between and inclusive of 5.0 and 8.5, without departing from the spirit of the invention. Organic acidic congeners can include, but are not limited to, organic carboxylic acids such as acetic acid, lactic acid, propionic acid, tartaric acid and butyric acid.

After removal or separation of the salt forms of the organic acidic congeners from the pH-treated FB solution, the pH of the resulting refined FB may have a slightly different and partly lower pH, or partly higher pH, than the pH of the unfiltered and neutralized bright beer, depending on the $pK_a$ of any organic acids remaining in the refined FB. In some embodiments, the refined FB has a lower pH than a pH-treated FB in which the organic acid congeners have been neutralized but not removed. In some embodiments, the neutralized organic acidic congeners can be retained within the pH-treated FB without undergoing a subsequent removal step.

The alkaline treating agent can include one or more basic compounds, including both strong and weak bases, that are capable of reacting with and neutralizing organic acids.

Suitable strong bases can include, but are not limited to, a caustic solution comprising at least one Arrhenius base that increases the concentration of hydroxide ions in a solution with water, such as the alkali (Group I) and alkaline earth (Group II) metal hydroxides potassium hydroxide, sodium hydroxide, barium hydroxide, cesium hydroxide, strontium hydroxide, calcium hydroxide, lithium hydroxide, and rubidium hydroxide. Stock solutions of the caustic solution can be any concentration, but in some embodiments, the concentration is sufficiently high to safely add a minimal amount of the caustic solution to neutralize acidic congeners within the bright beer without substantially affecting its volume. In some embodiments, the caustic solution comprises up to a 50% (v/v) solution of sodium hydroxide. In some embodiments, the caustic comprises up to a 50% (v/v) solution of potassium hydroxide.

Upon reacting with any one of the metal hydroxides listed above, the at least one organic acidic congener is converted to a salt and water, according to net ionic equation in Equation 1, below.

$$HA(aq) + OH^-(aq) \rightarrow A^-(aq) + H_2O(\ell) \quad (1)$$

In a non-limiting example, when the organic acidic congener is acetic acid, the neutralization reaction proceeds according to Equation 2, shown below.

$$CH_3COOH(aq) + OH^-(aq) \rightarrow CH_3COO^-(aq) + H_2O(\ell) \quad (2)$$

In other embodiments, the alkaline treating agent can comprise a weak base. Generally, a weak base does not dissociate completely in water and can exist in equilibrium with its conjugate acid. As with the strong bases, enough of a weak base can be added to neutralize a portion of the acidic congeners within the FB. In some embodiments, enough weak base is added to completely neutralize all of the acidic congeners that are present. Suitable weak bases can include, but are not limited to, sodium acetate, sodium bicarbonate, and ammonium hydroxide. In some embodiments, the alkaline treating agent comprises ammonium hydroxide. As a non-limiting example, the equation of the neutralization reaction between acetic acid and ammonium hydroxide is shown below in Equation 3.

$$CH_3COOH(aq) + NH_4OH(aq) \leftarrow CH_3COONH_4(aq) + H_2O(\ell) \quad (3)$$

However, in any reaction between a weak acid and a weak base, the resulting net ionic equation results in the production of water, according to Equation 4, below.

$$H^+(aq) + OH^-(aq) \leftarrow H_2O(\ell) \quad (4)$$

In another embodiment, the neutralization of the at least one acidic congener can be accomplished by titrating into the bright beer a sufficient amount of the alkaline treating agent to transform at least a portion of the organic acidic congeners within the FB into organic salts, or filterable forms thereof. In some embodiments, all, or substantially all, of the organic acidic congeners within the FB are neutralized into organic salts or filterable forms thereof, which can be accomplished by raising the pH enough to reach or surpass the equivalence point of each of the organic acidic congeners within the FB and convert them into their respective conjugate bases. When a weak acid is titrated with a strong base, such as NaOH, the equivalence point occurs above a pH of 7. As a non-limiting example, the $pK_a$ of acetic acid is 4.75, and the pH at the equivalence point, in which all, or substantially all, of the acetic acid has been converted to acetate, is typically around 8.7 to 8.8. Increasing the pH of the FB with a strong base beyond the equivalence point simply adds additional hydroxide ions to the solution, without measurably affecting the concentration of acetic acid.

In some embodiments, refined NMB's with substantially no measurable organic acids can be produced, for example, when a completely flavorless, odorless, and colorless beverage is desired. Such refined NMB's can be versatilely used as bases for the widest variety of flavored beverages, without clashing with any of the flavors introduced in the production of the flavored beverage. However, in some embodiments, a refined FB or NMB in which some of the organic acids are retained after neutralization can be desired. In some embodiments, the flavors provided by some organic acids can supplement or enhance the odor and/or taste of compounds that are added during the flavoring process to produce a flavored beverage, and complete neutralization of those acids could negatively affect a person's organoleptic experience.

Accordingly, and in some embodiments, the neutralization of the at least one acidic congener can be accomplished by titrating into the FB or bright beer a sufficient amount of the alkaline treating agent to transform at least a portion of the organic acids within the FB or bright beer into organic salts, or filterable forms thereof. In some embodiments, the amount of alkaline treating agent added to the FB is the amount sufficient to neutralize at least about 10 percent by weight of the organic acidic congeners within the FB, which can be at least about 25 percent (%), or at least 50%, or at least 60%, or at least 70%, or at least 75%, or at least 80%, or at least 85%, or at least 90%, or at least 95%, or at least 96%, or at least 97%, or at least 98%, or at least 99%, or at least 99.5%, or at least about 99.9 percent by weight of the organic acidic congeners within the FB. In some embodiments, less than about 99.9 percent by weight of the organic acidic congeners within the FB are neutralized, including less than about 99.5, 99, 98, 97, 96, 95, 90, 85, 80, 75, 70, 60, 50, or 25 percent, down to less than 10 percent by weight.

One way to determine the extent of the neutralization of the organic acids within an FB is to compare the titratable acidity—a calculation of the total mass of hydronium ions ($H_3O^+$) and protonated weak acids in a volume of solution, often expressed as grams per liter or parts per million—of an untreated FB with a treated or refined FB. Titratable acidity is commonly used within the brewing and winemaking industries because pH only describes the amount of $H_3O^+$ ions in a solution. In contrast, humans can perceive acidity from both $H_3O^+$ ions and protonated weak acids. Titratable acidity is determined by calculating how much of a base, usually NaOH, must be added to the beverage in order to raise the pH of the beverage to a pre-determined value, which is typically near the equivalence point of the titration. In the brewing industry, the pre-determined pH value is typically between about 8.0 and 8.5, based on the identity and relative quantity of the organic acids that are present.

Furthermore, the perceived acidity of an FB itself can be evaluated using titratable acidity. As the titratable acidity decreases, the perceived acidity also decreases, and can ultimately reach a point where a person cannot perceive the taste and/or smell of acid(s) within the FB. In some embodiments, the titratable acidity of a refined FB is less than about 1 gram per liter (g/L), including less than about 0.75, 0.5, 0.4, 0.3, 0.2, 0.1, or 0.05, down to less than about 0.01 g/L.

In some embodiments, the neutralization of a single organic acid congener can be quantified, including the acetic acid, lactic acid, propionic acid, tartaric acid and butyric acid congeners listed above. In some embodiments, the single organic acid congener that is quantified is acetic acid. Upon addition of an alkaline treating agent to the FB, acetic acid is subsequently converted to an acetate salt. At the $pK_a$ of acetic acid, which is about 4.75, the ratio of acetate to acetic acid within a solution is 50:50. As the pH of the solution is increased, the relative abundance of the acetate salt compared to acetic acid is also increased, so at one pH unit above the $pK_a$, 5.75, the ratio of acetate to acetic acid is 90:10, at two pH units above the $pK_a$, the ratio of acetate to acetic acid is 99:1, and so on. Thus, in some embodiments, the amount of alkaline treating agent added to an FB can be an amount sufficient to raise the relative abundance of the acetate salt compared to acetic acid to be at least about 50:50, including at least about 60:40, 70:30, 75:25, 80:10, 85:15, 90:10, 95:5, 96:4, 97:3, 98:2, 99:1, or 99.5:0.5, up to at least about 99.9:0.1. In some embodiments, the relative abundance of acetate salt to acetic acid within the treated FB is about 90:10 to about 99:1, or about 92:8 to about 98:2, or about 95:5. In some embodiments, all, or substantially all, of the acetic acid within the FB is neutralized to an acetate salt. In some embodiments, all, or substantially all, of the acetic acid is neutralized when the pH of the FB is raised to at least 8.7.

Similarly, the concentration of acetic acid within an FB can be determined analytically. Non-limiting examples of analytical methods to determine acetic acid concentration within an FB include high performance liquid chromatography (HPLC) and enzymatic assays. One such enzymatic assay kit for determining the concentration of acetic acid is the K-ACETRM acetic acid test kit, available from Megazyme®. Under assay conditions, all, or substantially all, of the acetic acid that is present in an FB sample is converted to acetate. However, if the pH of the FB sample is known, one can determine how much acetic acid is present based on the $pK_a$, as discussed above. For example, if the pH of a FB is 6.35, and the concentration of the acetate in the sample is determined to be 300 ppm, then approximately 4 percent of the acetic acid in the treated FB is present in the protonated form, or about 12 ppm.

Thus, in some embodiments, the combined concentration of acetic acid and acetate within a refined FB, after separating and removing salts of the organic acid congeners that were formed during neutralization, can be less than about 1000 parts per million by weight (ppm), which can be less than about 900 ppm, or less than about 800 ppm, or less than about 700 ppm, or less than about 600 ppm, or less than about 500 ppm, or less than about 400 ppm, or less than about 300 ppm, or less than about 200 ppm, less than about 100 ppm, or less than about 50 ppm. In some embodiments, the combined concentration of acetic acid and acetate within a refined FB is in a range of about 200 ppm to about 500 ppm. In some embodiments, the combined concentration of acetic acid and acetate within a refined FB is in a range of about 300 ppm to about 400 ppm.

In another embodiment, the concentration of acetic acid in its protonated form within a refined FB, based on its pH, is less than about 500 ppm, including less than about 400, 300, 200, 100, 75, 50, 25, 10, or 5, down to less than about 1 ppm. In some embodiments, the concentration of protonated acetic acid in the refined FB is in a range of about 10 ppm to about 100 ppm, or about 25 ppm to about 75 ppm. In some embodiments, there is substantially no protonated acetic acid within the refined FB.

Within an industrial brewmaking process, bright beer and other untreated FB's can be neutralized in single batches that must attain a specific pH before being pumped to the next station/processing step, or over the course of a continuous process as the FB is constantly pumped from one location to another. Several instrumentation and electrode systems for monitoring and adjusting the pH of a liquid are known in the art. Such non-limiting examples include batch processing, in-line processing, and continuous stirred-tank pH monitoring and dosing systems, for example, available from Omega® Engineering, located in Stamford, Connecticut.

In an embodiment of the invention, and as illustrated in FIG. 1, a caustic dosing system and method can include a mixing vessel for holding a determined quantity of an FB containing organic acid congeners. The determined quantity of the FB can be based on mass, such as by a weigh scale 35 for the contents of the container 33, by a volume indicator in the container 33, or by the delivery of a volumetric amount of the FB or bright beer into the container 33. After the determined quantity of the FB is treated to neutralize the organic acids, the treated FB or determined quantity of the FB can be emptied from the container 33 to a post-filtration or separation apparatus 4 to remove the salt forms of the organic acids.

To determine how much of the alkaline treating agent to add to the mixing container to neutralize the organic acid congeners within the FB, a known concentration of the alkaline treating agent can be titrated into a known amount of the FB that has been aliquoted into a separate container, until a target pH is reached. The target pH can include any of the pH values listed above. Once the target pH is reached, one can determine the molar ratio of the alkaline treating agent to the organic acid congeners within the FB, using the known concentration and volume of the alkaline treating agent titrated into the FB, using well-known calculations. Once the molar ratio between the alkaline treating agent and the organic acid congeners are known, one can determine how much of the alkaline treating agent to add, with mixing, to the known volume of the FB within the mixing container to reach the same pH. The alkaline treating agent used to treat the contained quantity of FB can be the same alkaline treating agent used to titrate the sample, or can be a different alkaline treating agent in a stoichiometric-equivalent quantity. The treated contained quantity of the FB can then be emptied from the container to a post-filtration or separation apparatus to remove the salt forms of the organic acids.

In another embodiment, the post-filtration or separation apparatus 4 can comprise one or more filters for removing neutralized organic acid salts, other congeners originally present in the untreated FB, and solids including but not limited to small molecules and metal chelates, macromolecules such as proteins and nucleic acids, microorganisms such as bacteria and/or viruses, and particulates. Pore size for the filters can be selected based on the desired properties of the refined FB, and can range from less than 1000 microns down to less than 1 micron, including less than 0.1 microns. Additionally, one or more filtration mechanisms can be utilized, including but not limited to: coarse, micro-, nano-, and ultrafiltration membranes; reverse osmosis filtration; diatomaceous earth filtration; and charcoal filtration. In some embodiments, the post-filtration or separation apparatus 4 can comprise a reverse osmosis filtration apparatus. Other separation apparatuses can include ion exchange chromatography, particularly cation exchange chromatography; gravitation; centrifugation; and/or decantation.

In another embodiment, the post-filtration or separation apparatus 4 can comprise one or more distillation apparatuses that can be utilized in a process to make a refined spirit, in which fractions containing ethanol are separated from aqueous fractions containing the neutralized organic acid salts, as well as other minor chemical constituents, that are produced or were present during the mashing process. Distillation apparatuses can include, but are not limited to:

column distillation, vacuum distillation, multi-stage flash distillation, multiple-effect distillation, and vapor-compression distillation apparatuses.

In another embodiment, filtration and distillation apparatuses can be utilized in combination or wholly separate from one another. For example, and in one embodiment, a refined FB can be produced by filtering out the organic acid congeners, without using distillation. In some embodiments, a refined spirit can be produced by distilling out the alcohol from a neutralized FB solution containing the organic acidic congeners in salt form, without using filtration. In some embodiments, a refined spirit can be produced by first filtering out the salt forms of the organic acidic congeners from the treated FB, and then subsequently distilling the filtrate to produce the refined spirit.

In some embodiments, the invention provides a method for producing a refined FB having reduced or negligible levels of organic acidic congeners, comprising the steps of (a) providing a FB comprising at least one acidic congener; (b) neutralizing the FB by titrating a sufficient amount of an alkaline treating agent into the FB to convert all, or substantially all, of the at least one acidic congener from the FB into an organic salt to produce a treated FB; and (c) separating the salt forms of the organic acids from the neutral FB to produce an FB.

In some embodiments, the invention provides a method for producing a refined spirit having reduced or negligible levels of organic acidic congeners, can comprise the steps of: (a) providing an FB comprising ethanol and at least one organic acidic congener; (b) neutralizing at least a portion of the at least one organic acidic congener by titrating or adding into the FB a sufficient amount of an alkaline treating agent to convert the at least one acidic congener into an organic salt to form a neutralized FB; and (c) distilling the ethanol from the neutralized FB containing the organic salts of the acidic congener, thereby producing a refined spirit. In some embodiments, the method for producing a refined spirit further comprises the step of filtering at least a portion of the organic salt from the neutralized FB, prior to the distillation step.

Figure 2:
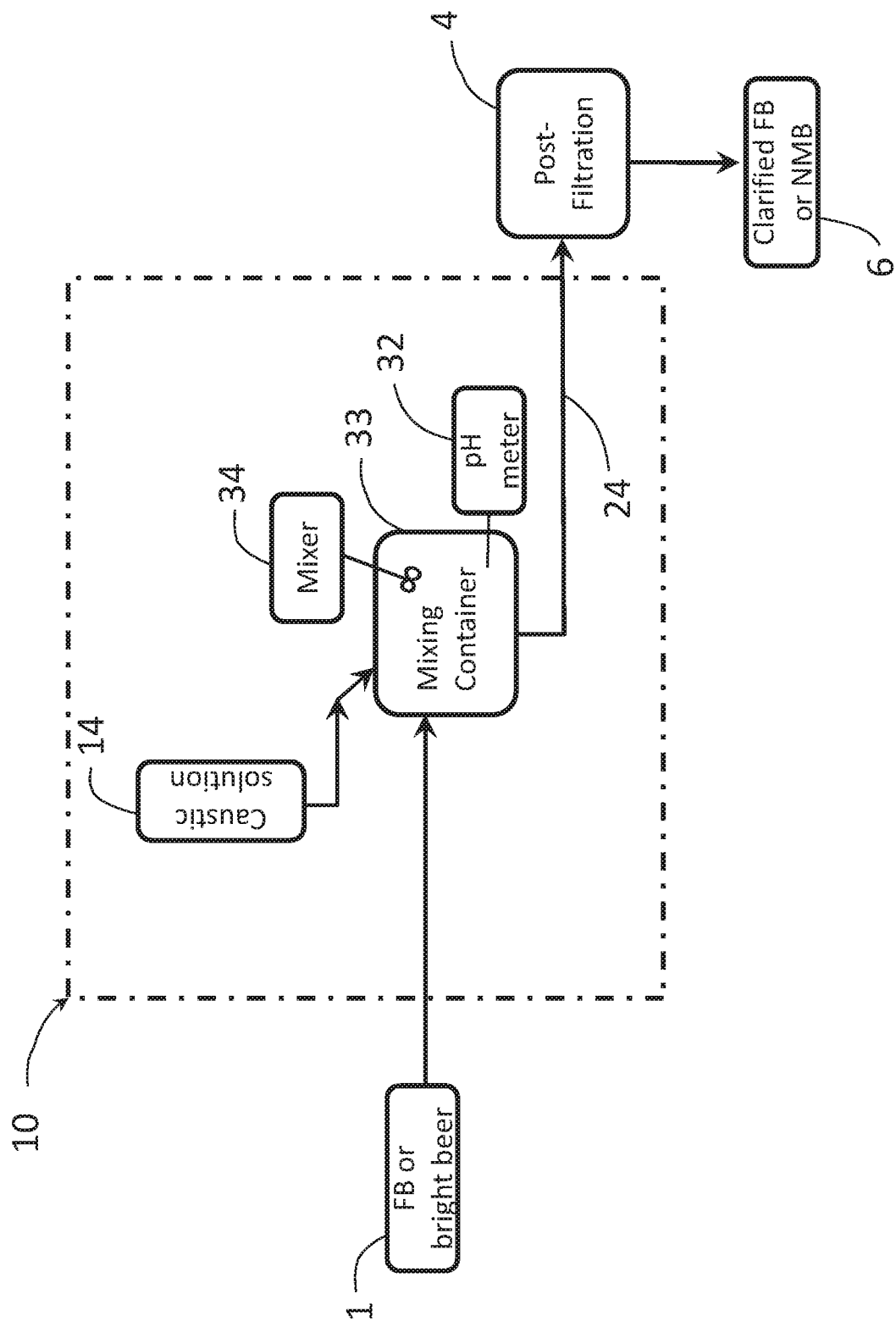
FIG. 2 shows a schematic diagram of a caustic dosing system and process for neutralizing organic acids in an FB solution, using a continuous-batch neutralizing system.

In some embodiments, the refined spirit can be produced from a beverage that has already been distilled, though still contains a measurable level of acidic congeners, particularly organic acids. In some embodiments, a method for producing a refined spirit having reduced or negligible levels of organic acidic congeners can comprise the steps of: (a) providing a distilled beverage comprising ethanol and at least one organic acidic congener; (b) neutralizing at least a portion of the at least one organic acidic congener by titrating or adding into the distilled beverage a sufficient amount of an alkaline treating agent to convert the at least one acidic congener into an organic salt to form a neutralized distilled beverage; and (c) separating the organic salt from the neutralized distilled beverage to produce a refined spirit. In some embodiments, the separation of the organic salt from the neutralized distilled beverage comprises filtration. In some embodiments, the separation of the organic salt from the neutralized distilled beverage consists of filtration. In some embodiments, the separation of the organic salt from the neutralized distilled beverage comprises a second distillation. In some embodiments, the separation of the organic salt from the neutralized distilled beverage comprises filtration and a second distillation. In some embodiments, all, or substantially all, of the organic acidic congeners are separated from the neutralized distilled beverage to form the refined spirit In another embodiment, and as shown in FIG. 2, the caustic dosing system 10 can comprise a mixing means that includes a continuous-batch or batch mixing container 33 that retains a volume of treated FB solution, with a mixing device 34 for homogenizing the solution, and a pH meter for detecting the pH thereof, retained in the container 33. A pH meter 32 in communication with the controller 26 detects the pH of the treated FB solution retained in the tank, and the controller 26 adjusts the sufficient quantity of the caustic solution metered into the container 33 based on the rate or quantity of FB stream 20, and the pH of the treated FB solution as measured by the pH meter 32, or by the pH of the FB stream 20, or both. In this embodiment, the outflow of treated FB solution 24 can be substantially continuous.

In an embodiment wherein the container 33 is a batch mixing tank, a quantity of FB solution 1 is loaded into the tank 33, and a controlled quantity of caustic solution is passed or metered into the batch quantity of FB solution until a pH in the target pH range is achieved. The batch of pH-treated FB is then discharged from the tank 33 to post-filtration 4.

Figure 3:
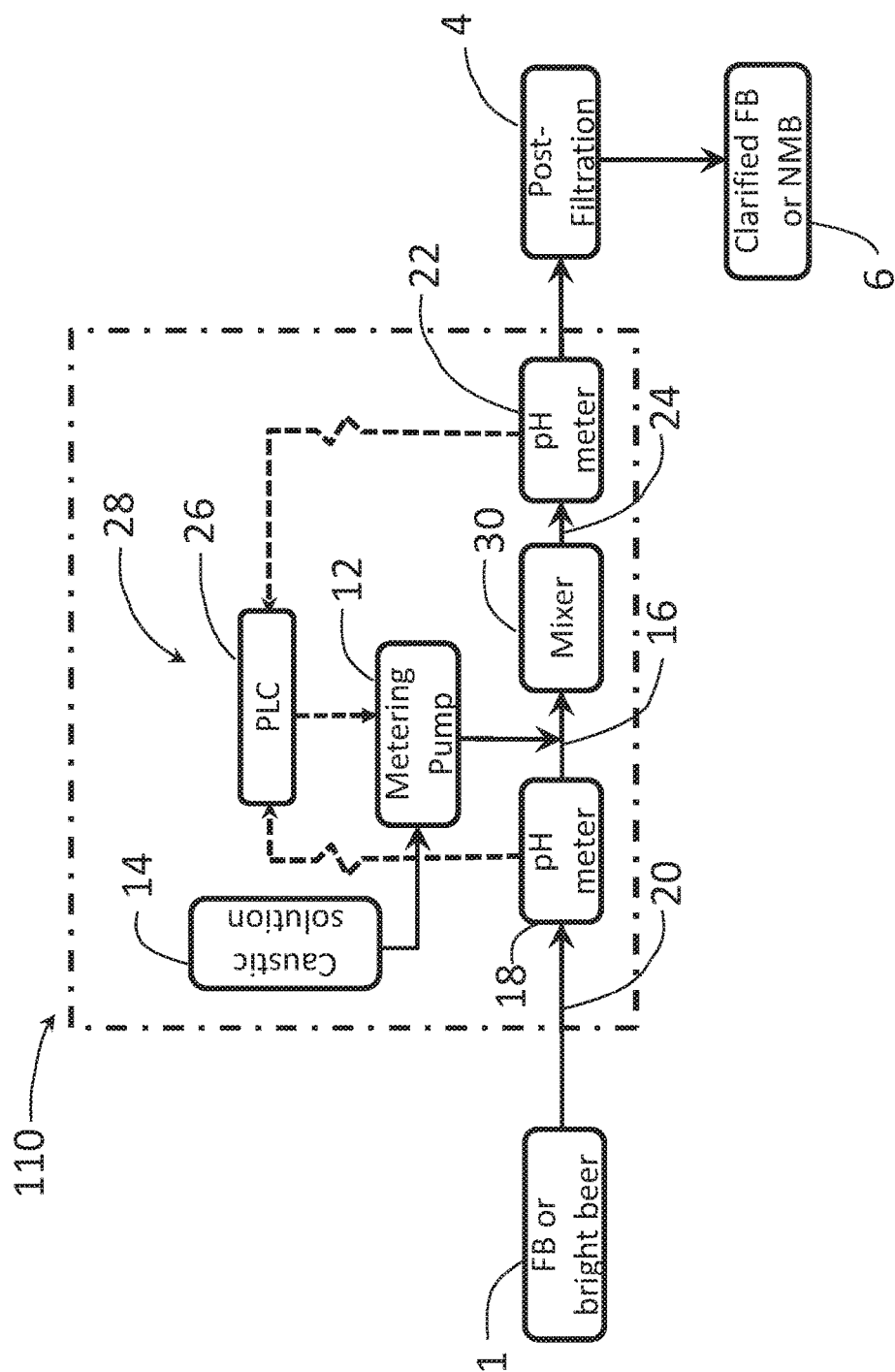
FIG. 3 shows a schematic diagram of a caustic dosing system and process for neutralizing organic acids in an FB solution, using an in-line continuous neutralizing system, employing a caustic solution metering pump.

In another embodiment, and as illustrated in FIG. 3, the pH monitoring and dosing system is an in-line caustic dosing system. The in-line caustic dosing system 110 processes an FB stream 1 into an outflow of a refined FB or NMB 6. The FB stream 1 passes to the in-line caustic dosing system 110, and after pH treatment of the FB stream 1 in the in-line caustic dosing system 110, the resulting neutralized FB 24 is processed by post-filtration 4 to remove or filter the salt forms of the organic acids, to produce the refined FB 6.

The in-line caustic dosing system 110 includes a metering means, illustrated as a metering pump 12, for metering a quantity of a caustic solution from a container 14 into a junction of the piping system 16 disposed between two pH meters, including a first pH meter 18 that detects the pH of the FB stream entering 20 the in-line caustic dosing system 110, and a second pH meter 22 that detects the pH of the treated FB stream 24 after the addition of the caustic solution. The two pH meters 18 and 22 and metering pump 12 are in data signal transfer and control communication with a programmable logic controller (PLC) 26 to form a communication and control loop 28 that detects pH of the FB streams, determines an amount of caustic solution sufficient to neutralize organic acidic congeners in the FB, and controls the quantity and/or rate of caustic solution added to the FB stream that is sufficient to neutralize the FB stream to a target pH range sufficient to neutralize the organic acidic congeners within the FB stream 20. In some embodiments, the concentrated caustic stock composition can be a 50% (w/v) solution of sodium hydroxide.

The flow rate of the FB stream 20 is determined by the processing conditions upstream for making the FB 1. While the volumetric flow rate is typically constant, some variation can be expected. In an embodiment of the invention, an upstream flow of the FB 1 can be captured into a holding container, and pumped at a more constant volumetric rate from the container to the in-line caustic dosing system 110. The holding container, would have sufficient volume to allow for fluctuations of the FB flowing in, while maintaining, or regulating, the flow rate of the FB stream 20 to the in-line caustic dosing system 110.

Typically, the pH of FB entering the caustic dosing system is less than about 6.0. In some embodiments, the pH of FB is less than about 5.0, or less than about 4.0, or less than about 3.0. However, the pH can vary according to the identity and concentration of the acidic congeners within the FB. For instance, the $pK_a$ values of acetic acid, lactic acid, propionic acid, and butyric acid are 4.75, 3.86, 4.87, and 4.82, respectively. As reported by Smith, (see "Variation in pH and Lactate Levels in Malts," above) the concentration of lactate in various malt varieties ranged from 17.6 to 126.3 milligrams per 100 grams of malt. Based on the pH of the FB entering the caustic dosing system determined at the pH meter 18, the PLC 26 determines the amount of caustic solution to add into the FB stream by metering pump 12 to raise the pH to within the target pH range to neutralize the organic acidic congeners.

The second pH meter 22, located on the outflow side of mixing means, discussed below, provides feedback control by communicating to the PLC 26 of the pH of the pH-treated FB stream after caustic solution is injected or added. In an embodiment of the invention, after the FB stream has passed through the in-line caustic dosing system 110, the neutralized or treated FB has a pH sufficient to neutralize the organic acid congeners. The PLC 26 can be configured to increase or decrease the amount or rate of caustic solution injected by the in-line caustic dosing system 110 until the pH of the neutralized (treated) FB is within the target pH range.

The in-line caustic dosing system 110 can also include a mixing means for mixing the stream of FB and the caustic solution into a homogenous pH-treated solution having a pH that has been adjusted into the target pH range. The mixing means ensures homogeneity of the pH-treated solution and improves the neutralization control and outcome. One embodiment of a mixing means is an in-line mixer 30, such as a static in-line mixer, as shown in FIG. 3. In another embodiment, shown in FIG. 5, a mixing means can comprise retention piping to increase the amount of time that the caustic solution is in contact with the stream of FB. The retention piping can comprise a length of flow piping 31, which can include one or a plurality of elbows or turns in piping, the length of the flow piping and/or the one or plurality of elbows being sufficient to homogenize the pH-treated solution.

Figure 4:
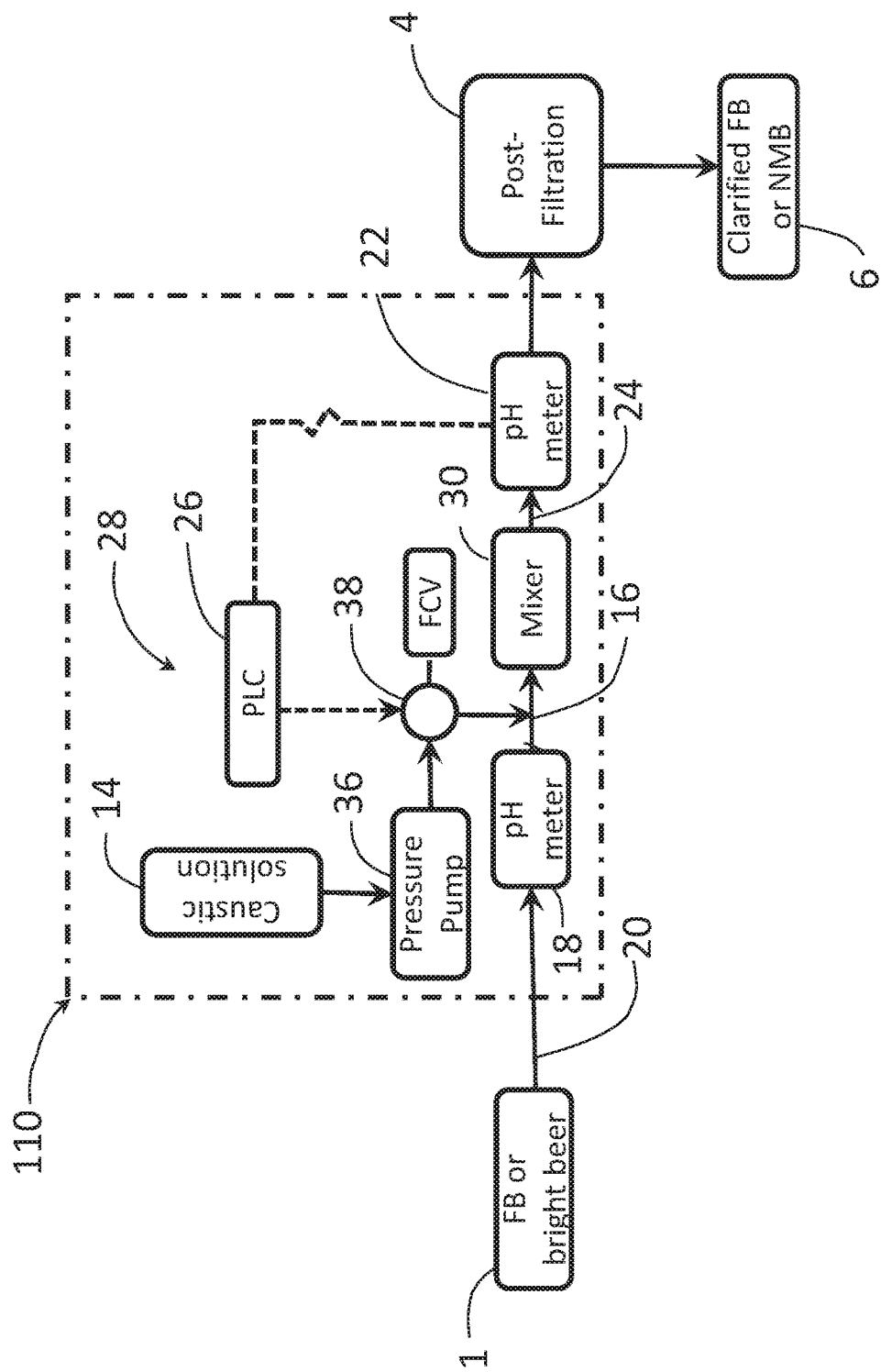
FIG. 4 shows a caustic dosing system and process similar to FIG. 3, employing a caustic flow control valve pump.

In an alternative embodiment of the in-line caustic dosing system 110, as shown in FIG. 4, the sufficient quantity of caustic solution is controlled using a flow control valve (FCV) 38 that regulates the solution under pressure from a pressure pump 36.

Figure 5:
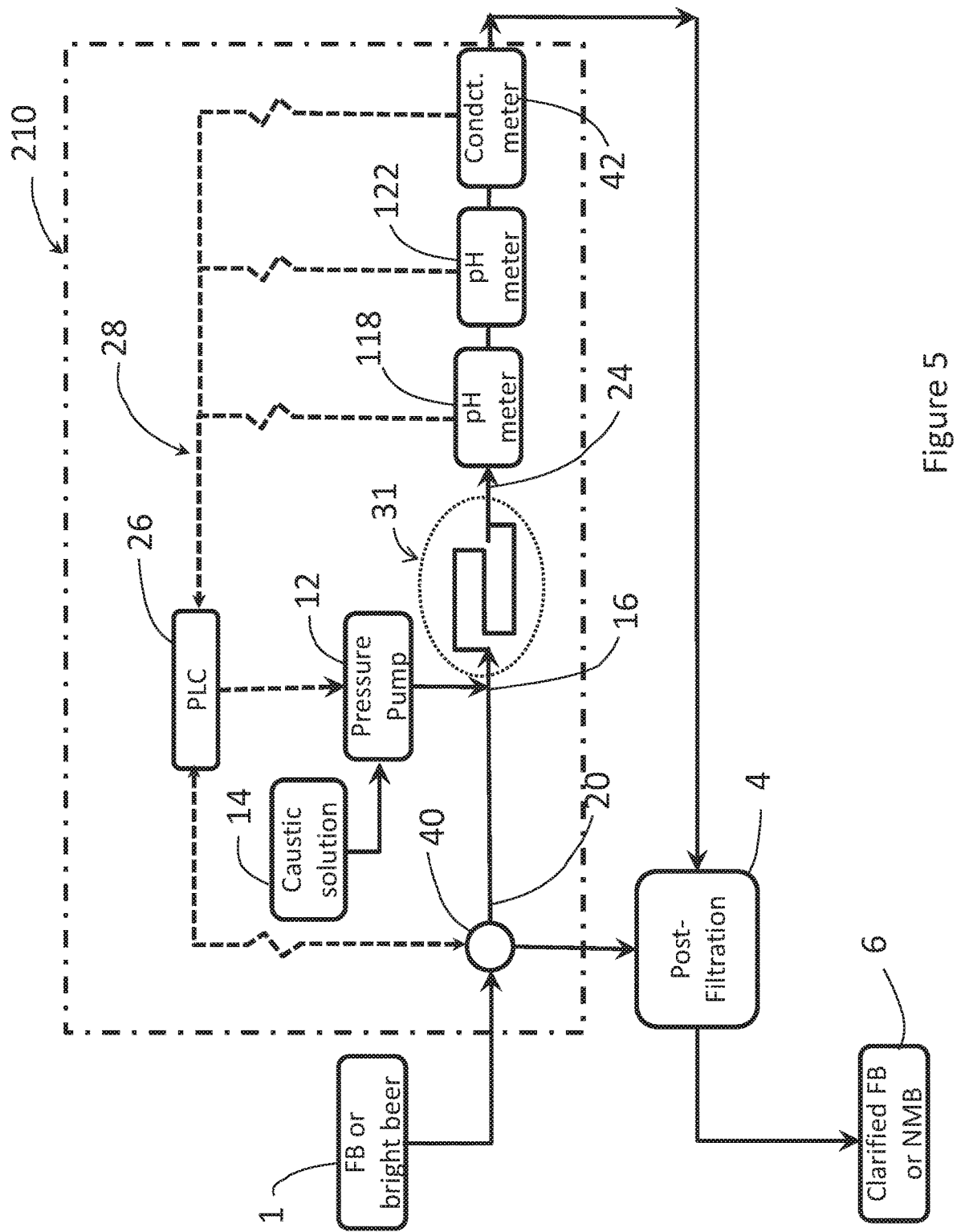
FIG. 5 shows an alternative schematic diagram of a caustic dosing system and process for neutralizing organic acids in an FB solution, including a means for diverting the stream bright beer to the pH monitoring and dosing system.

In another alternative embodiment and as shown in FIG. 5, an in-line caustic dosing system 210 can comprise a means for diverting the stream of FB 1 away from a filtration system, illustrated as the post-filtration system 4 described herein above, and into a pH monitoring and dosing system, illustrated as the in-line caustic dosing system. The diverting means comprises a three-way selection valve 40 having an inlet for the stream of FB 1, a first outlet 41 in fluid communication with the filtration system, and a second outlet 42 in fluid communication with the in-line caustic dosing system. The three-way selection valve 40 can be manually or mechanically actuated, and the mechanical actuation can be controlled by a control system. The three-way selection valve 40 also includes sensors or switches to detect its position, which can include a switch for detecting a first position when diverting the FB 1 to the filtration system, for detecting a second position when diverting the FB 1 to the in-line caustic dosing system. Optional other positions can also be detected, which may include a shutoff position that shuts off flow through the selection valve 40.

While the FB stream 20 is starting up and in conventional operating state, the three-way selection valve 40 is positioned in its first position to divert the FB 1 to the filtration system. When the in-line caustic dosing system is ready for operation, the diverting means embodied by the three-way selection valve 40 is actuated to its second position to divert the FB 1 to the in-line caustic dosing system, and a switch is activated that signals the PLC 26 that the FB stream 20 has been diverted to the in-line caustic dosing system. Once stable flow is achieved, the PLC 26 initiates startup at the metering pump 12 and detection by the pH meter(s) 118 (and 122) to bring the pH of the treated solution into the target pH range.

A metering pump 12, as illustrated and described in FIG. 3, dispenses the caustic solution into the FB 1 at a junction 16 upstream of a pH meter, illustrated as a pair of adjacent pH meters 118 and 122. The caustic solution is sufficiently mixed into the FB stream within the retention piping 31. As previously described, the PLC 26 controls the operation and caustic flow rate of the metering pump 12, to maintain the resulting pH of the pH-treated solution within its target pH range.

The retention piping 31 comprise an length of flow piping 31, which can include one or a plurality of elbows or turns in piping, the length of the flow piping and/or the one or plurality of elbows being sufficient to homogenize the pH-treated solution, and ensure a repeatable and consist measurement of the pH of the flowing stream. In the illustrated embodiment, the retention piping includes a plurality of lengths of piping and a plurality of 90-degree elbows to provide an amount of turbulence with the stream for homogenous mixing of the pH-treated solution.

In some embodiments that employ two pH meters, a first pH meter 118 and a second pH meter 122 adjacent and downstream of the first pH meter 118. The PLC 26 can receive and compare the pH readings from the two pH meters 118 and 122, in order to evaluate the homogeneity of the pH-treated FB. When the pH of the pH-treated FB at pH meter 18 and 22 is identical or nearly identical, then the pH-treated FB is presumed to be homogenous, whereas, if the pH readings at pH meters 18 and 22 are different, then the pH-treated FB is presumed not to be homogenous, and indicating that more mixing within the holding tube 40 is needed. In such embodiments, the retention piping can comprise auxiliary piping into which the mixing stream can be directed for additional mixing.

Also as illustrated in FIG. 5, the in-line caustic dosing system 210 can additionally comprise a conductivity meter 42 that can be utilized to determine whether the organic acid congeners within the pH-treated FB or beer stream have been neutralized. In general, conductivity meters measure the electrical conductivity within a solution by measuring the amount of ionized species within the solution. Measuring conductivity is often useful for inline acid-base titrations at constant temperature because conductivity can be measured quickly and the conductivity is often comparable from one production run to another.

For example, in acid-base titrations in which a strong base is titrated into a solution of one or more weak acids, the addition of the strong base changes the conductivity of the weak acid solution. At first, the addition of NaOH creates a buffer solution in which the $H^+$ concentration within the solution is only slowly reduced, and the conductivity falls slightly. The decrease in conductivity is counteracted as more base is introduced to the solution and more $Na^+$ is produced along with the conjugate base of the weak acid, increasing the conductivity of the solution. After all of the acid has been neutralized and the equivalence point has been reached, adding further NaOH typically increases the conductivity of the system sharply, as $OH^-$ ions begin to accumulate and pre-dominate the ionic species within the solution.

The metering pump 12 and conductivity meter 42 are in data signal transfer and control communication with PLC 26 and within the communication and control loop 28. The PLC 26 can be configured to increase or decrease the amount or rate of caustic solution injected by the in-line caustic dosing system 110 until the conductivity of the treated FB is within a target conductivity range. In another embodiment, the flow rate and/or volume of the caustic solution metered into the untreated FB stream from one production run can be utilized to set an initial flow rate and/or volume of the caustic solution metered into the untreated FB stream in successive production runs.

It will be clear and obvious to persons of ordinary skill in the art that there are other apparatus, devices, and systems that can be employed to control a sufficient quantity and/or rate of caustic solution. Similarly, although FIGS. 1 through 5 above utilize a caustic solution as the alkaline treating agent, persons of ordinary skill in the art would recognize that an alkaline treating agent comprising a weak base can be substituted in part or whole for the caustic solution in any of the systems described above in order to neutralize the organic acidic congeners within the FB.

In another embodiment, refined FB produced by the systems described above is a refined NMB. In some embodiments, the alcohol content (ABV) of a refined NMB is at least about 0.05 percent, including at least about 0.1, at least about 0.5, at least about 1, at least about 2, at least about 3, at least about 4, at least about 5, at least about 6, at least about 7, at least about 8, at least about 9, at least about 10, at least about 12, at least about 15, at least about 17, at least about 20, at least about 25, at least about 30, at least about 35, at least about 40, at least about 45, at least about 50, at least about 55, at least about 60, and at least about 65 percent by volume of the NMB. In other embodiments, the ABV of a refined NMB is less than or equal to about 65, including less than or equal to about 60, less than or equal to about 55, less than or equal to about 50, less than or equal to about 45, less than or equal to about 40, less than or equal to about 35, less than or equal to about 30, less than or equal to about 25, less than or equal to about 20, less than or equal to about 15, less than or equal to about 10, less than or equal to about 9, less than or equal to about 8, less than or equal to about 7, less than or equal to about 6, less than or equal to about 5, less than or equal to about 4, less than or equal to about 3, less than or equal to about 2, less than or equal to about 1, less than or equal to about 0.5, less than or equal to about 0.1, and less than or equal to about 0.05 percent by volume of the NMB. Useful ranges can be selected from any of the above ABV values between and inclusive of about 0.05 percent to about 65 percent by volume of the NMB, including from about 5 percent to about 20 percent by volume, from about 10 percent to 20 percent by volume, from about 12 percent to 20 percent by volume, from about 15 percent to about 20 percent by volume, from about 17 percent to about 20 percent by volume, from about 10 percent to about 17 percent by volume, or from about 12 percent to about 15 percent by volume. In some embodiments, the refined NMB further comprises hops. In some embodiments, the NMB is substantially free of hops. In some embodiments, the NMB is a gluten-free base (GFB). In some embodiments, the NMB is a gluten-reduced or gluten-removed base.

In some embodiments, the ABV of a refined spirit produced by any of the above neutralization methods or systems is at least about 5, including at least about 8, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90 percent by volume, and at least about 95 percent by volume of the refined spirit. In some embodiments, the ABV of a refined spirit produced by any of the above neutralization methods or systems is less than or equal to about 95, less than or equal to about 90, less than or equal to about 85, less than or equal to about 80, less than or equal to about 75, less than or equal to about 70, less than or equal to about 65, including less than or equal to about 60, less than or equal to about 55, less than or equal to about 50, less than or equal to about 45, less than or equal to about 40, less than or equal to about 35, less than or equal to about 30, less than or equal to about 25, less than or equal to about 20, less than or equal to about 15, less than or equal to about 10, less than or equal to about 8, and less than or equal to about 5 percent by volume of the NMB. Useful ranges can be selected from any of the above ABV values between and inclusive of about 1 percent by volume and 95 percent by volume, 20 percent by volume and 30 percent by volume, 20 percent and 40 percent by volume, 20 percent and 50 percent by volume, 20 percent and 60 percent by volume, 20 percent and 70 percent by volume, 20 percent and 80 percent by volume, 20 percent and 90 percent by volume, 40 percent and 45 percent by volume, 40 percent and 50 percent by volume, 40 percent and 60 percent by volume, 40 percent and 70 percent by volume, or 40 percent and 80 percent by volume.

In some embodiments, the invention provides a neutralization system for neutralizing a bright beer to produce a refined NMB having substantially neutral pH organic acid forms, comprising: a beer stream, an in-line caustic dosing system, and at least one filtration or separation apparatus configured to filter out the salt forms of the acid congeners from the beer stream. The in-line caustic dosing system can comprise at least one pH meter for monitoring the pH of the beer stream, a container for an alkaline treating agent, a metering pump, and a central programmable logic controller (PLC) that is configured to monitor the pH of the beer stream collected by the at least one pH meter and to control the amount of the alkaline treating agent dispensed from the container by the metering pump.

While particular embodiments of the invention have been described, the invention can be further modified within the spirit and scope of this disclosure. Those skilled in the art will recognize, or be able to ascertain using no more than routine experimentation, numerous equivalents to the specific procedures, embodiments, claims, and examples described herein. As such, such equivalents are considered to be within the scope of the invention, and this application is therefore intended to cover any variations, uses or adaptations of the invention using its general principles. Further, the invention is intended to cover such departures from the present disclosure as come within known or customary practice in the art to which this invention pertains and which fall within the appended claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The contents of all references, patents, and patent applications mentioned in this specification are hereby incorporated by reference, and shall not be construed as an admission that such reference is available as prior art to the present invention. All of the incorporated publications and patent applications in this specification are indicative of the level of ordinary skill in the art to which this invention pertains, and are incorporated to the same extent as if each individual publication or patent application was specifically indicated and individually indicated by reference.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. Thus, while the present invention has been described above with particularity, the following examples provide further detail in connection with what are presently deemed to be the most practical and preferred embodiments of the invention.

Example 1: Production of NMBs Using a Caustic Dosing System

An NMB is produced in accordance with embodiments of the present disclosure, using any of the caustic dosing systems described above. A bright beer containing acidic congeners is introduced into the caustic dosing system and a quantity of sodium hydroxide is added to the bright beer, with mixing, until a pre-determined target pH of the treated FB is reached, about 6.0. The treated FB is subsequently filtered through a reverse osmosis membrane to remove neutralized organic acids from the treated FB and form an NMB. Additional NMBs are produced using the same procedure, except with target pH's of 7.0 and 8.0, respectively.

Example 2: Physiochemical Analysis of the Acidity of NMBs

A study is conducted in accordance with embodiments of the present disclosure to determine the acidity and the extent of neutralization and removal of organic acids, particularly acetic acid, of NMBs produced by the caustic dosing system of Example 1. Each of the three NMBs produced in Example 1, as well as a sample of untreated bright beer, are evaluated for pH, titratable acidity, and acetic acid content. The pH of each FB sample is determined using a pH meter, either as a standalone instrument or disposed within the caustic dosing system. The titratable acidity of each FB sample is approximated by titrating a known concentration of sodium hydroxide to reach a pre-determined pH, such as for example, 8.2, 8.5, or 8.7, based on the original pH of the FB sample. The concentration of acetic acid in each FB sample, either in its protonated (acetic acid) or deprotonated (sodium acetate) form is determined by reacting a small volume of the FB sample with reagents included with the Megazyme® K-ACETRM acetic acid test kit, according to instructions included with the kit.

It is expected that the pH of the bright beer is approximately 4.0, and that the pH of the NMB samples is within 0.25 pH units of each of the pH targets—6.0, 7.0, and 8.0, respectively. Additionally, it is expected that the titratable acidity of the bright beer is greater than 1.00 g/L, and particularly greater than 2.00 g/L, while the titratable activity of each of the NMB samples exhibits at least an 80% decrease relative to the titratable activity of the bright beer. The extent of neutralization, exhibited by the titratable acidity of each of the NMB samples, is expected to increase as a function of the pH of the sample, with the NMB that is neutralized to a pH of 8.0 having least titratable activity relative to the other samples. Finally, it is expected that the total concentration of the protonated and deprotonated forms of acetic acid will decrease by at least 75% in each of the NMB FB samples, relative to the bright beer sample, with the greatest effect again being seen in the pH 8.0 FB sample. However, based on the actual pH of the NMB sample, the concentration of protonated acetic acid in each of the NMB samples is expected to be reduced by at least 95% relative to the bright beer sample.

Example 3: Determination of the Taste Profile of NMBs

A study is conducted in accordance with embodiments of the present disclosure to determine the organoleptic effects caused by the neutralization and removal of acetic acid from a bright beer. Participants in a sensory panel trained to distinguish the taste of vinegar notes resulting from the presence of protonated acetic acid are asked to sample each of the NMBs produced in Example 1 and score them according to a Likert-type scale. Likert-like scales used in taste and smell evaluation can ask participants to assign a score from 0 to 5, where each score is particularly defined, often with no half scores allowed. With respect to vinegar notes in particular, a Likert-type scale can have the following definitions: 0=no perceptible vinegar notes; 1=a hint of vinegar notes are perceptible; 2=vinegar notes are slightly perceptible; 3=vinegar notes are slightly-moderately perceptible; 4=vinegar notes are moderately perceptible; and 5=vinegar notes are moderately-strongly perceptible.

It is expected that untreated bright beer, having a relatively high concentration of protonated acetic acid, will exhibit average taste scores indicating a slight-moderate to moderate perception of vinegar notes. Upon treatment with sodium hydroxide, the average taste score of each of the treated samples is expected to be reduced relative to the bright beer and exhibit the same relationship as the titratable acidity and acetic acid concentrations determined in Example 2 with respect to pH, in that the NMB with a pH of 8.0 has the greatest reduction in the perception of vinegar notes relative to the other NMB samples. It is also expected that least one of the treated NMBs, particularly the NMB treated to a pH of 8.0, has no perceptible vinegar notes.

We claim:

1. A method of producing a refined bright beer having a reduced level of acetic acid, by neutralizing and removing a portion of the acetic acid within a bright beer, comprising the steps of:
   (a) providing a bright beer comprising acetic acid;
   (b) treating the bright beer, by adding into the bright beer a sufficient amount of an alkaline treating agent to convert acetic acid within the bright beer into an acetate salt, wherein the ratio of acetate salt to acetic acid within the treated bright beer is in a range from at least about 50:50, up to about 99:1; and
   (c) separating at least a portion of the acetate salt formed in step (b) from the treated bright beer, thereby producing a refined bright beer having a reduced level of acetic acid relative to the bright beer provided in step (a).

2. The method according to claim 1, wherein the bright beer further comprises one or more organic acids selected from the group consisting of: lactic acid, tartaric acid, propionic acid, butyric acid, and mixtures thereof; and the amount of alkaline treating agent added to the bright beer is sufficient to convert at least a portion of the one or more additional organic acids into their organic salts.

3. The method according to claim 1, wherein the step of providing the bright beer comprises the sub-steps of:
   i) providing a wort or a wort extract, the wort or wort extract comprising a fermentable carbohydrate source, the fermentable carbohydrate source consisting of one or more cereal grains selected from the group consisting of millet, rice, sorghum, corn, barley, wheat, rye, and a mixture thereof;
   ii) adding yeast into the wort or wort extract to form a fermentation composition; and
   iii) fermenting substantially all of the cereal grains within the fermentation composition into ethyl alcohol, thereby forming a bright beer.

4. The method according to claim 3, wherein the step of providing the bright beer further comprises the sub-step of removing solids contained within the bright beer, to form a clarified bright beer.

5. The method according to claim 3, wherein the refined bright beer has less than 20 ppm of gluten.

6. The method according to claim 3, wherein the refined bright beer is gluten-free.

7. The method according to claim 1, wherein the step of separating at least a portion of the acetate salt comprises the sub-step of filtering, treating, or decolorizing the treated bright beer by a process selected from the group consisting of ultrafiltration, nanofiltration, reverse osmosis filtration, adsorption using activated carbon or a sepiolite material, and combinations thereof.

8. The method according to claim 7, wherein the refined bright beer is a colorless, odorless, and flavorless neutral malt base.

9. The method according to claim 8, wherein the neutral malt base comprises: at least 10%, and up to 20%, by volume of ethyl alcohol; an acetic acid concentration of less than 100 ppm; a titratable acidity, relative to acetic acid, of less than 0.5 grams per liter; and a pH in the range of 5.8 to 6.5.

10. The method according to claim 9, wherein the neutral malt base contains less than 20 ppm of gluten.

11. The method according to claim 8, wherein the method further comprises the step of adding one or more flavoring agents to the neutral malt base to form a flavored malt beverage.

12. The method according to claim 11, wherein the flavored malt beverage has an alcohol content, by volume (ABV) of at least 3%, and up to 10%.

13. The method according to claim 12, wherein the flavored malt beverage comprises less than 25 ppm of acetic acid.

14. The method according to claim 1, wherein the alkaline treating agent comprises a Group I or Group II metal hydroxide.

15. The method according to claim 1, wherein the treated bright beer formed in step (b) has a pH less than 6.5.

16. The method according to claim 15, wherein the refined bright beer comprises: an ABV of less than 20%; an acetic acid concentration of less than 100 ppm; a titratable acidity, relative to acetic acid, of less than 0.5 grams per liter; and a pH of less than 5.8.

17. The method according to claim 16, wherein the method further comprises the step of adding one or more flavoring agents to the refined bright beer to form a refined flavored malt beverage.

18. The method according to claim 17, wherein the refined flavored malt beverage comprises less than 25 ppm of acetic acid and a pH of less than 5.0.

19. The method according to claim 18, wherein the refined flavored malt beverage has an ABV of less than 10%.

20. The method according to claim 19, wherein the refined flavored malt beverage contains less than 20 ppm of gluten.

* * * * *